(12) United States Patent
Srinivasan et al.

(10) Patent No.: US 12,517,544 B2
(45) Date of Patent: Jan. 6, 2026

(54) POWER REDUCTION AND EFFECTIVE TIMING EXCEPTIONS HANDLING IN AT-SPEED CAPTURE

(71) Applicant: STMicroelectronics International N.V., Geneva (CH)

(72) Inventors: Venkata Narayanan Srinivasan, Greater Noida (IN); Shiv Kumar Vats, Greater Noida (IN); Umesh Chandra Srivastava, Greater Noida (IN)

(73) Assignee: STMicroelectronics International N.V., Geneva (CH)

( * ) Notice: Subject to any disclaimer, the term of this patent is extended or adjusted under 35 U.S.C. 154(b) by 224 days.

(21) Appl. No.: 18/337,720

(22) Filed: Jun. 20, 2023

(65) Prior Publication Data

US 2024/0427366 A1 Dec. 26, 2024

(51) Int. Cl.
*G06F 1/06* (2006.01)
(52) U.S. Cl.
CPC ..................................... *G06F 1/06* (2013.01)
(58) Field of Classification Search
CPC ...... G06F 1/06; G06F 30/333; G06F 30/3312; G01R 31/318544; G01R 31/3187; G01R 31/318552; G01R 31/318575; G01R 31/318594; G01R 31/318541
See application file for complete search history.

(56) References Cited

U.S. PATENT DOCUMENTS

| | | | |
|---|---|---|---|
| 8,917,123 B2 | 12/2014 | Bahl et al. | |
| 9,222,981 B2 | 12/2015 | Puvvada et al. | |
| 9,291,674 B1* | 3/2016 | Lu | G01R 31/3177 |
| 9,377,511 B2 | 6/2016 | Li | |
| 10,451,674 B2 | 10/2019 | Dani et al. | |
| 11,016,145 B1 | 5/2021 | Lesser et al. | |
| 11,680,984 B1* | 6/2023 | Pradeep | G01R 31/318536 714/726 |
| 2005/0055615 A1* | 3/2005 | Agashe | G01R 31/318552 714/727 |
| 2008/0282110 A1* | 11/2008 | Guettaf | G01R 31/318594 714/30 |
| 2009/0187801 A1* | 7/2009 | Pandey | G01R 31/318558 714/729 |
| 2017/0176535 A1* | 6/2017 | Khandelwal | G01R 31/31727 |
| 2018/0203067 A1* | 7/2018 | Chen | G01R 31/31723 |
| 2021/0033669 A1* | 2/2021 | Cheng | G01R 31/3177 |
| 2021/0109153 A1* | 4/2021 | Waayers | G06F 30/333 |
| 2022/0091919 A1* | 3/2022 | Acharya | G11C 29/12015 |
| 2022/0244308 A1 | 8/2022 | Srinivasan et al. | |

* cited by examiner

*Primary Examiner* — Danny Chan
(74) *Attorney, Agent, or Firm* — Slater Matsil LLP

(57) ABSTRACT

According to an embodiment, a method for testing a scan chain is provided. The method includes receiving a first clock signal and a first scan enable signal and generating a second and third clock signal based on the first clock signal and the first scan enable signal. The third clock signal is delayed by a clock pulse from the second clock signal. The first, second, and third clock signal have the same duty cycle. The method further includes providing the second clock signal and the second scan enable signal to, respectively, a clock terminal and scan enable input of a first scan flip-flop of the scan chain. The method further includes providing the third clock signal and a third scan enable signal to, respectively, a clock terminal and a scan enable input of a last scan flip-flop of the scan chain.

20 Claims, 8 Drawing Sheets

POWER REDUCTION AND EFFECTIVE TIMING EXCEPTIONS HANDLING IN AT-SPEED CAPTURE

TECHNICAL FIELD

The present disclosure generally relates to design for testing (DFT) and, in particular embodiments, to at-speed scan coverage.

BACKGROUND

The increase in the size of silicon chips and the rise in the number of logic levels in the silicon-on-chip (SoC) have been driven by the continuous advancement of semiconductor manufacturing processes. Over time, these processes have allowed for the fabrication of transistors and other components at smaller dimensions, enabling more functionality to be integrated into a single chip. As the size of chips increases, more transistors can be packed onto them, leading to greater complexity and functionality. This growth in complexity, coupled with the increase in logic levels, poses challenges in terms of power consumption. The chip's power requirements can become critical with more transistors switching states and performing operations. This increase in power consumption leads to several concerns, such as heat dissipation, battery life in portable devices, and overall power efficiency.

Various techniques are employed at chip design and implementation stages to address power consumption challenges. These techniques include power gating, voltage scaling, clock gating, and low-power design methodologies. Power gating involves selectively shutting down or reducing power to inactive or idle parts of the chip. Voltage scaling reduces the chip's operating voltage to reduce power consumption, while clock gating involves dynamically disabling clocks to inactive circuit blocks. Low-power design methodologies optimize the overall chip architecture and circuit designs for reduced power consumption.

Automatic Test Pattern Generation (ATPG) tools generate test patterns that can detect faults or defects in a design. These patterns are usually generated based on the logical representation of the design, disregarding the physical layout information. The ATPG tools aim to achieve high fault coverage and ensure test patterns can effectively exercise the design's logic. In contrast, the physical design team provides the timing exceptions file, the Synopsys Design Constraints (SDC). The SDC contains information about the timing constraints and exceptions specific to the physical implementation of the design. This file helps guide the implementation tools in meeting the required timing specifications during the place-and-route stage.

Typically, the ATPG tools do not directly understand the SDC file or its timing exceptions. However, during the testing and verification process, the ATPG-generated test patterns are usually applied at a lower level of abstraction, where the physical design and timing constraints are considered. These patterns are then simulated or tested against the design's timing model, incorporating the SDC file information. The timing simulations consider the SDC file to ensure the generated test patterns avoid violating the specified timing constraints. In this way, the ATPG tool indirectly considers the timing exceptions by utilizing the timing models and rules used during the simulation or testing phase. This can help to prevent the generation of test patterns that would fail timing simulations due to violations of the specified constraints.

At-speed capture refers to capturing or sampling signals on a chip or within a circuit while operating at maximum clock frequency or speed. It is an essential technique for testing and verifying the functionality and performance of high-speed designs. During at-speed capture, the inputs to the design are driven with test patterns, and the outputs are observed or captured using specialized circuitry. This allows for the detection of potential timing violations, functional errors, or faults that may occur at the operating frequency of the design.

As mentioned earlier, handling timing exceptions involves dealing with specific timing constraints and exceptions that arise during a chip's physical design and implementation stages, as specified, for example, in the SDC file. When it comes to at-speed capture, timing exceptions play a crucial role. Some timing paths in a design may be exempted from meeting the strict timing requirements for various reasons, such as physical limitations or trade-offs in the design. These exceptions are typically defined in the SDC file to relax the timing constraints for specific paths. The test patterns generated by ATPG tools are usually designed to accommodate these exceptions and avoid creating patterns that violate the specified timing constraints for exempted paths.

The ATPG tool considers the timing exceptions specified in the SDC file during at-speed capture test generation while generating test patterns to ensure that the generated patterns avoid violating the exempted paths' timing constraints, which requires the ATPG tool to consider the exceptions and create test patterns that adhere to the relaxed timing requirements. During at-speed capture test verification, once the test patterns are generated, they are simulated or applied to the design for verification. Further, the timing exceptions specified in the SDC file are utilized to simulate the exempted paths with relaxed timing constraints.

A reduction in power consumption and the handling of timing exceptions during at-speed capture is, thus, desirable.

SUMMARY

Technical advantages are generally achieved by embodiments of this disclosure which describe power reduction in at-speed capture.

A first aspect relates to a control circuit that includes a first flip-flop, a first NOT gate, a first multiplexer, a second multiplexer, a first OR gate, a second OR gate, and a first clock gate circuit. A data terminal of the first flip-flop configured to receive a first scan enable signal, a clock terminal of the first flip-flop configured to receive a first clock signal, and an output terminal of the first flip-flop configured to provide a first latched scan enable signal. The first NOT gate is configured to receive the first latched scan enable signal and provide an inverted first latched scan enable signal. The first input of the first multiplexer configured to receive a first test control signal, a second input of the first multiplexer configured to receive a second test control signal, a third input of the first multiplexer configured to receive the first latched scan enable signal, a fourth input of the first multiplexer configured to receive the inverted first latched scan enable signal, a first select terminal of the first multiplexer configured to receive a first select signal, and a second select terminal of the first multiplexer configured to receive a second select signal. A first input of the second multiplexer configured to receive a functional logic signal, a second input of the second multiplexer configured to receive an output signal from the first multiplexer in accordance with the first select signal and the second select signal, and a select terminal of the second multiplexer configured to receive a third test control signal. A first input of the first OR gate is configured to receive the first scan enable signal, and a second input of the first OR gate is configured to receive a fourth test control signal. A first input of the second OR gate coupled to an output of the first OR gate, a second input of the second OR gate configured to receive an output signal from the second multiplexer in accordance with the third test control signal. The first clock gate circuit has a first latch coupled to a first AND gate, a data terminal of the first latch coupled to an output of the second OR gate, and a gated negative-set terminal of the first latch configured to receive the first clock signal. The first clock gate circuit configured to provide a second clock signal.

A second aspect relates to an integrated circuit. The integrated circuit includes a control circuit and a scan chain. The control circuit is configured to receive a first clock signal and a first scan enable signal, and generate a second clock signal and a third clock signal based on the first clock signal and the first scan enable signal, the third clock signal being delayed by a clock pulse from the second clock signal, and the first clock signal, the second clock signal, and the third clock signal having the same duty cycle. The scan chain includes a first scan flip-flop and a last scan flip-flop, a clock terminal of the first scan flip-flop configured to receive the second clock signal, a clock terminal of the last scan flip-flop configured to receive the third clock signal, a scan enable input of the first scan flip-flop configured to receive a second scan enable signal, and a scan enable input of the last scan flip-flop configured to receive a third scan enable signal.

A third aspect relates to a method for testing a scan chain in an integrated circuit. The method includes receiving, by a control circuit, a first clock signal and a first scan enable signal; generating, by the control circuit, a second clock signal and a third clock signal based on the first clock signal and the first scan enable signal, the third clock signal being delayed by a clock pulse from the second clock signal, and the first clock signal, the second clock signal, and the third clock signal having the same duty cycle; providing the second clock signal to a clock terminal of a first scan flip-flop of the scan chain, a scan enable input of the first scan flip-flop configured to receive a second scan enable signal; and providing the third clock signal to a clock terminal of a last scan flip-flop of the scan chain, a scan enable input of the last scan flip-flop configured to receive a third scan enable signal.

Embodiments can be implemented in hardware, software, or any combination thereof.

BRIEF DESCRIPTION OF THE DRAWINGS

For a more complete understanding of the present disclosure and the advantages thereof, reference is now made to the following descriptions taken in conjunction with the accompanying drawings, in which.

DETAILED DESCRIPTION OF ILLUSTRATIVE EMBODIMENTS

Figure 1:
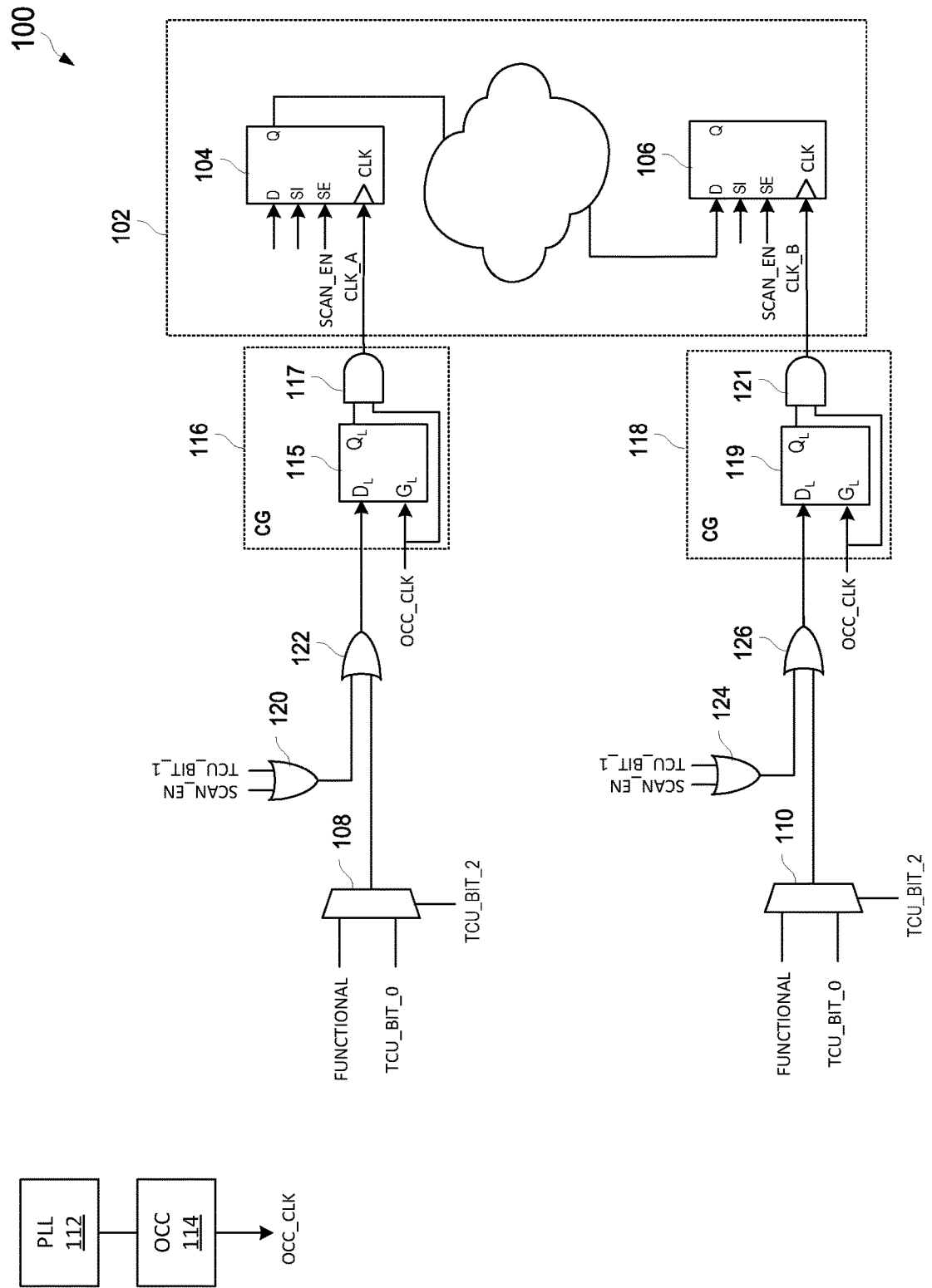
FIG. 1 is a block diagram of a standard architecture of a gate control circuit.

This disclosure provides many applicable inventive concepts that can be embodied in a wide variety of specific contexts. The particular embodiments are merely illustrative of specific configurations and do not limit the scope of the claimed embodiments. Features from different embodiments may be combined to form further embodiments unless noted otherwise.

Variations or modifications described in one of the embodiments may also apply to others. Further, various changes, substitutions, and alterations can be made herein without departing from the spirit and scope of this disclosure as defined by the appended claims.

While the inventive aspects are described primarily in the context of design for test, it should also be appreciated that they may also apply to other digital circuits. In particular, aspects of this disclosure may apply to applications in automotive, industrial, space, or any other application that could benefit from improved scan coverage.

When an Automatic Test Pattern Generation (ATPG) generates test patterns, it typically involves manipulating the circuit's inputs to activate specific paths and observing the outputs for detecting faults or verifying the functionality. Capturing the outputs involves latching or storing the output values in memory elements, such as flip-flops or latches, for subsequent analysis or comparison. During this capture phase, power consumption is associated with the switching activities in the circuit. The power consumed depends on various factors, including the size and complexity of the circuit, the number of flip-flops or latches used for capturing, the signal's activity and switching patterns, and the underlying technology and implementation details. Excessive power consumption during the capture phase can affect the overall power budget, reliability, and the ability to perform testing effectively. High capture power may result in issues such as excessive heat generation, potential timing violations, or voltage drop problems.

By employing various techniques to manage capture power, designers can mitigate the impact of capture power, ensuring efficient testing while managing power consumption within acceptable limits. A common approach includes hardware masking of timing exceptions, as shown, for example, in FIG. 1, where hardware, such as the multiplexer 108, 110, is added to the end-point flip-flops (e.g., endpoint scan flip-flops 104, 106) of the multi-cycle path or the false path.

A multi-cycle path in an integrated circuit requires multiple clock cycles to propagate a signal from the source to the destination. It occurs when combinational logic elements or clock domain crossings along the path introduce delays, causing the signal to take multiple clock cycles to reach its destination.

In scan chain testing, multi-cycle paths can present challenges because the scan chains typically operate on a single clock cycle. Since the test patterns are shifted into, and through the scan chains in a serialized manner, multi-cycle paths may not be fully exercised during a single test cycle, which can lead to reduced observability or controllability of the internal signals on these paths, potentially impacting the fault coverage achieved through scan testing.

A false path, on the other hand, is a path in an integrated circuit determined to be functionally irrelevant or intentionally excluded from being considered for timing analysis. It is typically declared a false path by the designers or the timing analysis tools (e.g., ATPG tool).

False paths are typically excluded from timing analysis because they are either impossible to activate during normal operation or their timing requirements are intentionally relaxed. These paths may include non-critical paths, paths with special-purpose constraints, or those known to be inactive during certain modes of operation. False paths can be important in scan chain testing because they should not be exercised or subjected to timing constraints during the testing process.

Both multi-cycle and false paths impact scan coverage and scan chain testing by influencing the observability, controllability, and timing considerations during the testing process. Proper identification and handling of these paths can be crucial for achieving comprehensive test coverage and accurate circuit behavior analysis.

Other common approaches to mitigating the impact of capture power include clock gating, power gating, test compression, and design optimization. In clock gating, the clock signal to unused or idle flip-flops or latches (e.g., functional logic) during the capture phase is disabled to reduce unnecessary switching activities and power consumption. In power gating (e.g., applying a power budget), the inactive or idle portions of the circuit during the capture phase are selectively disabled or reduced to minimize power consumption. In test compression, compression techniques are used to reduce the number of test patterns required for testing, thereby, reducing the overall capture power. In design optimization, low-power design techniques, such as voltage scaling, reduce the power consumed during the capture phase. Conventionally, these approaches have resulted in coverage loss.

For example, in large designs, with many timing exceptions, the ATPG tools do not fully respect the timing constraints and exceptions specific to the physical implementation of the design from, for example, the Synopsys Design Constraints (SDC) file, which can result in the generating of incorrect test patterns by the ATPG tool. A solution to this problem, which results in coverage loss, has been to mask the end-point flip-flops (e.g., masking inputs of the endpoint scan flip-flops using multiplexers) or prevent the at-speed fault generation from the start-point flip-flops using the ATPG tool commands. The addition of hardware, such as a multiplexer at the endpoints, adds further complexity.

Further, even if the ATPG tool correctly reads the timing exceptions from the SDC file, the result is coverage loss due to the inherent exceptions (e.g., multi-cycle constraints, false paths, etc.) provided by the SDC file and considered in the test pattern generation by the ATPG tool.

As another example, multiple test passes are typically required for complete coverage in multi-cycle paths, for example, at lower frequencies than at-capture frequency speeds of non-multi-cycle paths. This constraint results in at-speed coverage loss as the non-multi-cycle paths having common combinatorial logic with multicycle paths are tested at lower frequencies than at-capture frequency speeds and, multi-cycle paths have limited coverage at-capture frequency speeds during at-speed coverage. Likewise, false paths are not covered during at-speed coverage, resulting in at-speed coverage loss. Moreover, the timing exceptions fail to cover at-speed logic built-in self-test (LBIST). Thus, the conventional solutions have only provided for coverage of stuck-at LBIST.

For example, in a path that includes a first flip-flop, a second flip-flop, and a third flip-flop, with a clock frequency of 1 gigahertz (GHz), the paths from the first flip-flop to second flip-flop and second flip-flop to third flip-flop are met at a single cycle (i.e., 1 GHz); however, the path from the first flip-flop to third flip-flop (i.e., multi-cycle of two) with common combinatorial logic is met at two cycles (i.e., 500 megahertz (MHz)). Thus, the path with a multi-cycle of two will have two passes. In the first pass, the path from the first flip-flop to the second flip-flop is covered while the paths from the second flip-flop to the third flip-flop (having a common combinatorial logic with the first flip-flop to the third flip-flop) and the first flip-flop to the third flip-flop are masked—due to the multi-cycle constraint. During the second scan pass, the clock pulses will be provided at 500 MHz, and no multi-cycle restraint is kept for the path from the first flip-flop to the third flip-flop, which will cover at-speed. However, the path from the second flip-flop to the third flip-flop is covered at the lower frequency of 500 MHz but disadvantageously without the requisite check for 1 GHz. Embodiments of this disclosure advantageously provide a solution to this problem.

As yet another example, to capture power reduction by clock gating in a design with millions of gates, one would have to control the functional logic of all clock gates simultaneously, which is a complex problem. Generally, this solution either increases test pattern count or reduces coverage due to the limitations in controlling the functional logic blocks.

Embodiments of this disclosure provide a control circuit, an integrated circuit, and method for method for testing a scan chain in the integrated circuit. In embodiments, the method includes receiving, by the control circuit, a first clock signal and a first scan enable signal. The method further includes generating, by the control circuit, a second clock signal and a third clock signal based on the first clock signal and the first scan enable signal. Moreover, the method includes providing the second clock signal to a clock terminal of a first scan flip-flop of the scan chain. A scan enable input of the first scan flip-flop is configured to receive a second scan enable signal. Further, the method includes providing the third clock signal to a clock terminal of a last scan flip-flop of the scan chain. A scan enable input of the last scan flip-flop configured to receive a third scan enable signal.

In embodiments, the third clock signal is delayed by a clock pulse from the second clock signal. In embodiments, the first clock signal, the second clock signal, and the third clock signal have the same duty cycle. These and further details are discussed in greater detail below.

FIG. 1 illustrates a block diagram of a standard architecture of a gate control circuit 100. In gate control circuit 100, power consumption is managed using hardware masking at the endpoint scan flip-flops 104, 106 during at-speed capture, controlling clock gates of the functional logic blocks based on a power budget using the ATPG tool commands, and reading the timing exceptions provided by, for example, the SDC file (i.e., a software solution).

Gate control circuit 100 is used to test scan chain 102, which includes multiple scan flip-flops. It is noted that the number and arrangement of the scan flip-flops in scan chain 102 are non-limiting. Scan chain 102 includes a first scan flip-flop 104 at the beginning (i.e., first endpoint) and a last scan flip-flop 106 at the end (i.e., second endpoint) of scan chain 102. Scan chain 102 may include additional scan flip-flops between the first scan flip-flop 104 and the last scan flip-flop 106. The output at the output terminal (Q) of each scan flip-flop in scan chain 102 is coupled to the scan input terminal (SI) of the next scan flip-flop in scan chain 102. Each scan flip-flop in the scan chain 102 receives a scan enable signal (scan_en) at a respective scan enable input (SE).

As understood by a person of ordinary skill in the art, the output terminal (Q) provides an output for input at data terminal (D) when scan mode is disabled (i.e., the scan enable signal (SCAN_EN) is equal to '0'), whereas the output terminal (Q) provides an output for an input at the scan input terminal (SI) when scan mode is enabled (i.e., the scan enable signal (SCAN_EN) is equal to '1').

The SDC file, for example, can provide information that the scan chain 102 includes a multi-cycle or false path, which the ATPG tools can use to provide the hardware masking of the endpoint scan flip-flops 104, 106 using multiplexers 108, 110 during at-speed capture (e.g., during LBIST).

Scan testing may be implemented on the scan chain 102 using an automated test equipment (ATE). In embodiments, the ATE provides, for example, test pattern vectors to the scan input terminal (SI) of the first scan flip-flop 104, and the results (data shifted out) at the output terminal (Q) of the last scan flip-flop 106 are evaluated to determine faults in the scan chain 102.

Scan testing may also be performed as a logic built-in self-test (LBIST). The integrated circuit applies the test vectors to itself (e.g., using a pseudorandom number generator) and determines whether a fault occurred using an integrated circuit LBIST controller. Scan testing or the performance of LBIST may provide a way of detecting the presence of faults.

In embodiments, a phase-locked loop (PLL) 112 and an on-chip clock (OCC) generator 114, which is coupled to the output of the phase-locked loop 112, generate a clock signal (OCC_CLK).

Clock gating circuits 116, 118, multiplexers 108, 110, first two-input OR gates 120, 124, and second two-input OR gates 122, 126 are coupled to the clock terminals (CLK) of the end-point scan flip-flops of the scan chain 102 (i.e., the first scan flip-flop 104 and the last scan flip-flop 106). The first two-input OR gates 120, 124 have a first input coupled to a scan enable signal (SE) and a second input coupled to a second test control signal (TCU_BIT_1). The output of the first two-input OR gates 120, 124 is coupled to a first input of the second two-input OR gates 122, 126.

In embodiments, the clock gating circuit 116 includes a latch 115 and a two-input AND gate 117. The output terminal ($Q_L$) of the latch 115 is coupled to a first input of the two-input AND gate 117. The gated-negative set terminal ($G_L$) of the latch 115 is coupled to a second input of the two-input AND gate 117. The input terminal ($D_L$) of latch 115 is coupled to the output of the second two-input OR gate 122. The output of the two-input AND gate 117 is coupled to the clock terminal (CLK) of the first scan flip-flop 102, which provides the clock signal (CLK_A).

In embodiments, the clock gating circuit 118 includes a latch 119 and a two-input AND gate 121. The output terminal ($Q_L$) of the latch 119 is coupled to a first input of the two-input AND gate 121. The gated-negative set terminal ($G_L$) of the latch 119 is coupled to a second input of the two-input AND gate 121. The input terminal ($D_L$) of latch 119 is coupled to the output of the second two-input OR gate 126. The output of the two-input AND gate 121 is coupled to the clock terminal (CLK) of the last scan flip-flop 106, which provides the clock signal (CLK_B).

In embodiments, each of the latch 115 and 119 is a gated D latch.

Multiplexer 108 includes a first input coupled to a first functional logic block and second input coupled to a first test control signal (TCU_BIT_0). Multiplexer 110 includes a second input coupled to the first test control signal (TCU_BIT_0) and a first input coupled to a second functional logic block. Further, multiplexers 108, 110 include a select terminal coupled to a third test control signal (TCU_BIT_2). The output of the multiplexer 108, 110 is coupled to a second input of the second two-input OR gates 122, 126.

In embodiments, a test controller (not shown) selectively provides a logic high or low signal for each test control signal.

Multiplexers 108, 110 are configured such that the first test control signal (TCU_BIT_0) is provided at the output of the multiplexers 108, 110 in response to the third test control signal (TCU_BIT_2) being, for example, asserted. Multiplexers 108, 110 are configured such that the functional logic block is provided at the output of the multiplexers 108, 110 in response to the third test control signal (TCU_BIT_2) being, for example, de-asserted.

Clock gating circuits 116, 118 are configured such that when an active-low signal is asserted at the input of the gated negative-set terminal ($G_L$), the output terminal ($Q_L$) is forced to '0', irrespective of the value on the input terminal ($D_L$). The clock signal (OCC_CLK) is provided as an input to the gated-negative set terminal ($G_L$). The output terminal ($Q_L$) receives the OCC_CLK at its gated negative-set terminal ($G_L$) when its input terminal ($D_L$) is '1', and forced to '0' when its input terminal ($D_L$) is '0' OR its gated negative-set terminal ($G_L$) is '0'.

Thus, by selectively setting, for example, through the test tool, the third test control signal (TCU_BIT_2), and controlling the different functional logic, one can provide different clock signals to the endpoint scan flip-flops 104, 106.

Figure 2:
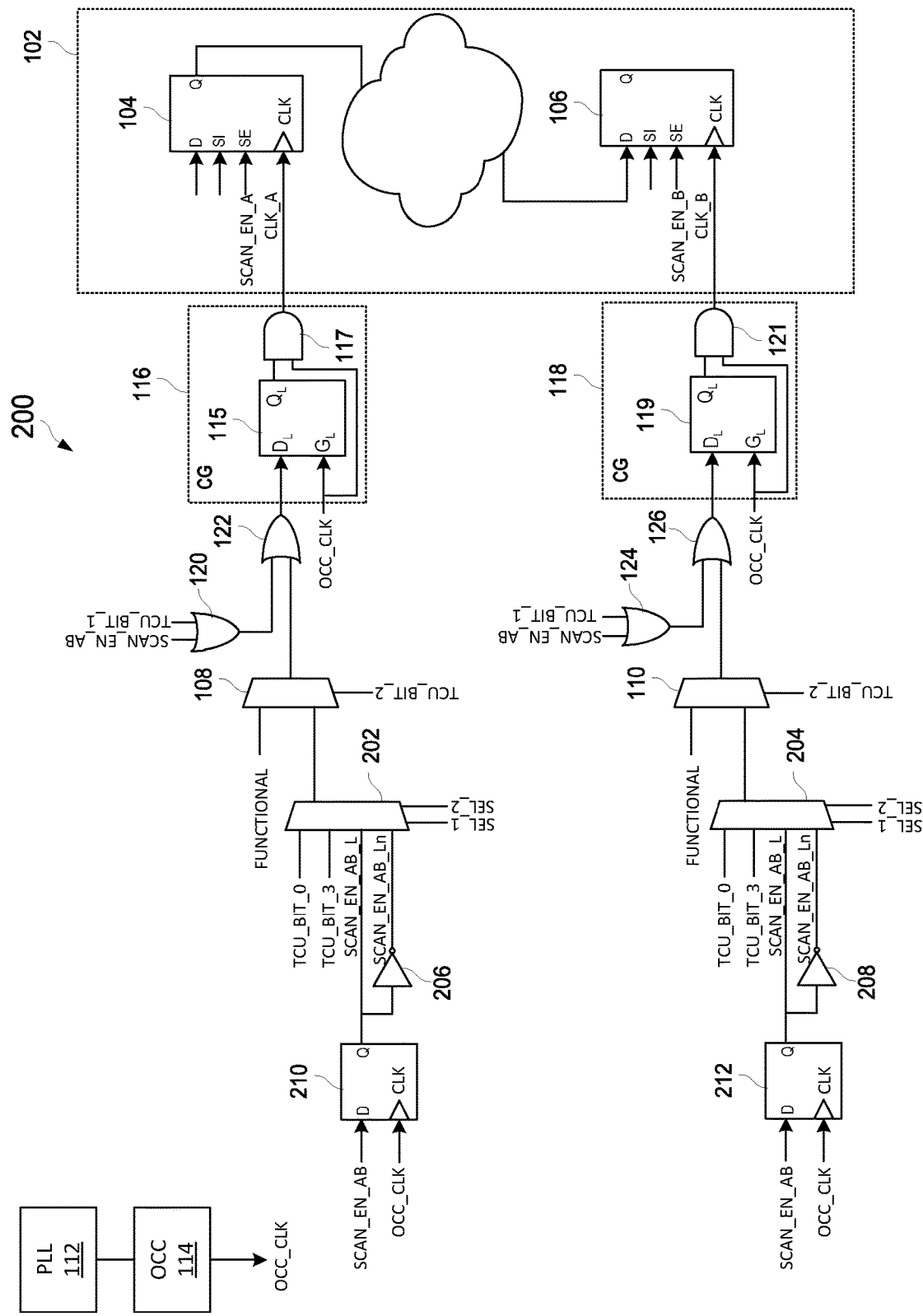
FIG. 2 is a block diagram of an embodiment controller circuit for managing power consumption in an integrated circuit.

FIG. 2 illustrates a block diagram of an embodiment controller circuit 200 for managing power consumption in an integrated circuit. Parts of the controller circuit 200 are structurally similar to gate control circuit 100. In addition to the components common between the two circuits (not described again for the sake of simplicity in the discussion), the controller circuit 200 includes a third multiplexer 202, a fourth multiplexer 204, a first NOT gate 206, a second NOT gate 208, a third flip-flop 210, and a fourth flip-flop 212, which may (or may not) be arranged as shown. The controller circuit 200 may include additional components not shown. Advantageously, the hardware solution of the controller circuit 200 provides different clock signals (CLK_A and CLK_B) to the endpoint scan flip-flops 104, 106, in contrast to the software solution in the gate control circuit 100.

In contrast to the gate control circuit 100, the first scan flip-flop 104 has a scan enable input (SE) coupled to a first scan enable signal (SCAN_EN_A), and the second scan flip-flop 106 has a scan enable input (SE) coupled to a second enable signal (SCAN_EN_B). Thus, the scan enable inputs of the endpoint scan flip-flops of scan chain 102 are coupled to different scan enable signals, allowing for independent scan handling.

The clock terminal (CLK) of each of the third flip-flop 210 and the fourth flip-flop 212 is configured to receive the clock signal (OCC_CLK) generated by the phase-locked loop 112 and the on-chip clock generator 114. Further, the input terminal (D) of each of the third flip-flop 210 and the fourth flip-flop 212 is configured to receive a third scan enable signal (SCAN_EN_AB).

The third multiplexer 202 and the fourth multiplexer 204 have four inputs and two select terminals. In embodiments, the first input terminals of the third multiplexer 202 and the fourth multiplexer 204 are configured to receive the first test control signal (TCU_BIT_0). In embodiments, the second input terminals of the third multiplexer 202 and the fourth multiplexer 204 are configured to receive a fourth test control signal (TCU_BIT_3). In embodiments, the third input terminals of the third multiplexer 202 and the fourth multiplexer 204 are coupled to the output terminals (Q) of the third flip-flop 210 and the fourth flip-flop 212, respectively. In embodiments, the third input terminals of the third multiplexer 202 and the fourth multiplexer 204 are configured to receive a latched third scan enable signal (SCAN_EN_AB_L) of the third scan enable signal (SCAN_EN_AB). In embodiments, the first NOT gate 206 and the second NOT gate 208 provide an inverted latched third scan enable signal (SCAN_EN_AB_Ln) of the third scan enable signal (SCAN_EN_AB).

In embodiments, a test controller (not shown) selectively provides a logic high or low signal for each test control signal.

In embodiments, the first select terminals of the third multiplexer 202 and the fourth multiplexer 204 are coupled to a first select signal (SEL_1). In embodiments, the second select terminals of the third multiplexer 202 and the fourth multiplexer 204 are coupled to a second select signal (SEL_2).

In contrast to gate control circuit 100, where an input of the multiplexers 108, 110 is configured to receive a first test control signal (TCU_BIT_0), in controller circuit 200, the inputs of the multiplexers 108, 110 are, respectively, coupled to the output terminals of the multiplexers 202, 204.

Further, in contrast to gate control circuit 100, where the first two-input OR gates 120, 124 have a first input coupled to a scan enable signal (SE), in controller circuit 200, the first input of each of the first two-input OR gates 120, 124 are coupled to the third scan enable signal (SCAN_EN_AB).

The structural and functional differences in controller circuit 200 allow the independent clock control of the clock terminals (CLK) using a first clock signal (CLK_A) and a second clock signal (CLK_B), and independent scan enable handling of the scan enable terminals (SE) of the endpoint scan flip-flops 104, 106.

Figure 3:
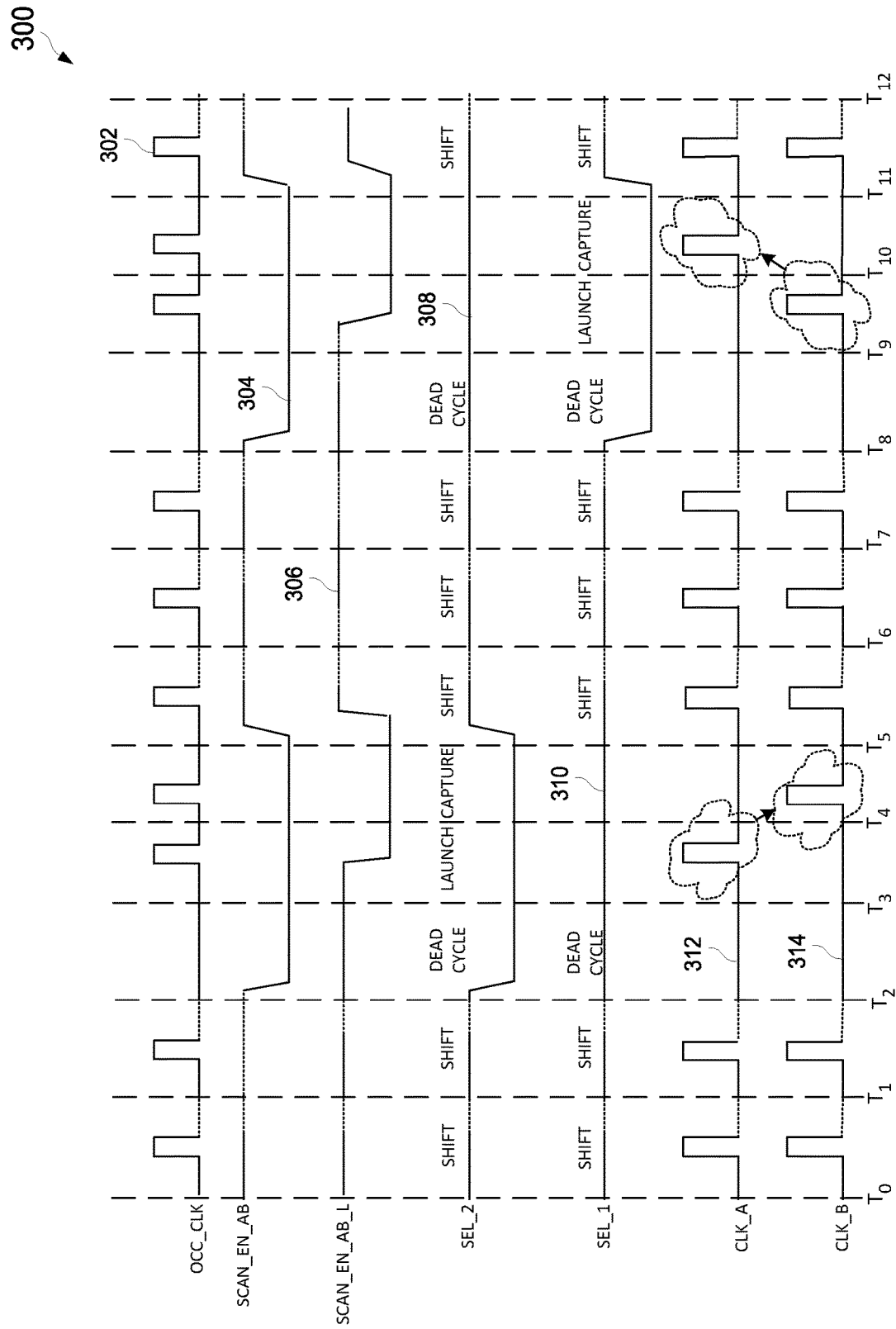
FIG. 3 is an illustration of timing diagrams of embodiment waveforms associated with the controller circuit in FIG. 2, in accordance with a launch-on-capture (LoC) scan testing implementation.

FIG. 3 illustrates timing diagrams of embodiment waveforms 300 associated with controller circuit 200, in accordance with a launch-on-capture (LoC) scan testing implementation. Waveforms 300 include the clock signal (OCC_CLK) 302, the third scan enable signal (SCAN_EN_AB) 304, the latched third scan enable signal (SCAN_EN_AB_L) 306, the first select signal (SEL_1) 308, the second select signal (SEL_2) 310, the clock signal (CLK_A) 312, and the clock signal (CLK_B) 314.

In embodiments, the clock signal (OCC_CLK) 302 is provided by the phase-locked loop 112 and the on-chip clock generator 114 and received at the gated negative-set terminal ($G_L$) of the latches 115, 119 and clock terminals (CLK) of flip-flops 210, 212.

The third scan enable signal (SCAN_EN_AB) 304 is received at the input terminals (D) of flip-flops 210, 212 and an input of OR gates 120, 124.

In embodiments, the third scan enable signal (SCAN_EN_AB) 304 is equal to the functional AND logic of the first scan enable signal (SCAN_EN_A) and the second scan enable signal (SCAN_EN_B) in response to the first scan enable signal (SCAN_EN_A) and the second scan enable signal (SCAN_EN_B) being generated externally to the integrated circuit (e.g., ATE testing). For example, where the first scan enable signal (SCAN_EN_A) is a logic low (e.g., '0'), and the second scan enable signal (SCAN_EN_B) is a logic high (e.g., '1'), the value of the third scan enable signal (SCAN_EN_AB) is equal to '0'.

In embodiments, the third scan enable signal (SCAN_EN_AB) 304 is equal to the value on the LBIST_SE and the PAD_SE pads of the integrated circuit in response to the first scan enable signal (SCAN_EN_A) and the second scan enable signal (SCAN_EN_B) being generated internally within the integrated circuit (e.g., LBIST, ATPG). In embodiments, the third scan enable signal (SCAN_EN_AB) 304 corresponds to the scan enable signal (SCAN_EN) in the gate control circuit 100 in FIG. 1.

The latched third scan enable signal (SCAN_EN_AB_L) 306 is a latched output from the output terminal (Q) of flip-flops 210, 212 and received at a third input terminal of the multiplexers 202, 204. Although not shown, the inverted latched third scan enable signal (SCAN_EN_AB_Ln) is an inverted logic signal of the latched third scan enable signal (SCAN_EN_AB_L) 306, which is provided at the outputs of the NOT gates 206, 208, and received at the fourth input terminal of the multiplexers 202, 204.

The first select signal (SEL_1) 308 and the second select signal (SEL_2) 310 are provided as select control signals for the multiplexers 202, 204, which selectively control the output of the multiplexers 202, 204 from their input signals.

In embodiments, the first select signal (SEL_1) 308 and the second select signal (SEL_2) 310, respectively, have a logic value equal to the first scan enable signal (SCAN_EN_A) and the second scan enable signal (SCAN_EN_B). In embodiments, the first select signal (SEL_1) 308 and the second select signal (SEL_2) 310, respectively, have a logic value equal to an inverted logic value of the first scan enable signal (SCAN_EN_A) and the second scan enable signal (SCAN_EN_B). In embodiments, the first select signal (SEL_1) 308 and the second select signal (SEL_2) 310, respectively, have a logic value equal to a fourth scan enable signal (SCAN_EN_C) and a fifth scan enable signal (SCAN_EN_D). In embodiments, the first select signal (SEL_1) 308 and the second select signal (SEL_2) 310 are provided by a scan decoder (not shown) coupled to the multiplexers 202, 204.

In an embodiment, the first control signal (TCU_BIT_0) at the first input of the multiplexer 202, 204, is provided at the output of multiplexers 202, 204, in response to the first select signal (SEL_1) 308 and the second select signal (SEL_2) 310 having logic values, respectively of '0' and '0'—non-limiting.

In an embodiment, the fourth control signal (TCU_BIT_3) at the second input of the multiplexers 202, 204, is provided at the output of the multiplexers 202, 204, in response to the first select signal (SEL_1) 308 and the second select signal (SEL_2) 310 having logic values, respectively of '1' and '1'—non-limiting.

In an embodiment, the latched third scan enable signal (SCAN_EN_AB_L) 306 at the third input of the third multiplexer 202 is provided at the output of the third multiplexer 202, in response to the first select signal (SEL_1) 308 and the second select signal (SEL_2) 310 having logic values, respectively of '1' and '0'. In this embodiment, the latched third scan enable signal (SCAN_EN_AB_L) 306 at the third input of the multiplexer 204 is provided at the output of the fourth multiplexer 204, in response to the first select signal (SEL_1) 308 and the second select signal (SEL_2) 310 having logic values, respectively of '0' and '1'. Further, the inverted latched third scan enable signal (SCAN_EN_AB_Ln) at the fourth input of the third multiplexer 202 is provided at the output of the third multiplexer 202 in response to the first select signal (SEL_1) 308 and the second select signal (SEL_2) 310 having logic values, respectively of '0' and '1'. Moreover, the inverted latched third scan enable signal (SCAN_EN_AB_Ln) at the fourth input of the multiplexer 204 is provided at the output of the fourth multiplexer 204 in response to the first select signal (SEL_1) 308 and the second select signal (SEL_2) 310 having logic values, respectively of '1' and '0'—non-limiting.

In embodiments where the first select signal (SEL_1) 308 is set to the first scan enable signal (SCAN_EN_A) and the second select signal (SEL_2) 310 is set to the second scan enable signal (SCAN_EN_B), the launch pulse on the clock signal (CLK_A) 312 and the capture pulse on the clock signal (CLK_B) 314 correspond to the first select signal (SEL_1) 308 having a logic value of '1' and the second select signal (SEL_2) 310 having a logic value of '0'. Likewise, the launch pulse on the clock signal (CLK_B) 314 and the capture pulse on the clock signal (CLK_A) 312 correspond to the first select signal (SEL_1) 308 having a logic value of '0' and the second select signal (SEL_2) 310 having a logic value of '1'.

In embodiments where the first select signal (SEL_1) 308 is different from the first scan enable signal (SCAN_EN_A) and the second select signal (SEL_2) 310 is different from the second scan enable signal (SCAN_EN_B), the launch pulse on the clock signal (CLK_A) 312 and the capture pulse on the clock signal (CLK_B) 314 (and the launch pulse on the clock signal (CLK_B) 314 and the capture pulse on clock signal (CLK_A) 312), correspond to the user select value of the first select signal (SEL_1) 308 and the second select signal (SEL_2) 310, respectively.

In embodiments, the clock signal (CLK_A) 312 is asserted and the clock signal (CLK_B) 314 is de-asserted at time $T_3$ to $T_4$. The clock signal (CLK_A) 312 is de-asserted and the clock signal (CLK_B) 314 is asserted at time $T_4$ to $T_5$. The asserting and the de-asserting of the clock signals (CLK_A and CLK_B) are based on the latched third scan enable signal (SCAN_EN_AB_L) 306 controlling clock gate circuit 116 (i.e., providing the clock signal (CLK_A) 312) and the inverted latched third scan enable signal (SCAN_EN_AB_Ln) controlling clock gate circuit 118 (i.e., providing the clock signal (CLK_B) 314).

In embodiments, the clock signal (CLK_B) is asserted and the clock signal (CLK_A) is de-asserted at time $T_9$ to $T_{10}$ and the clock signal (CLK_B) is de-asserted and the clock signal (CLK_A) is asserted at time $T_{10}$ to $T_{11}$. The asserting and de-asserting of the clock signals (CLK_A and CLK_B) are based on the latched third scan enable signal (SCAN_EN_AB_L) 306 controlling clock gate circuit 118 (i.e., providing the clock signal (CLK_B) 314) and the inverted latched third scan enable signal (SCAN_EN_AB_Ln) controlling clock gate circuit 116 (i.e., providing the clock signal (CLK_A) 312).

When the latched third scan enable signal (SCAN_EN_AB_L) 306 controls the clock gate circuit 116 and the inverted latched third scan enable signal (SCAN_EN_AB_Ln) controls the clock gate circuit 118, the first scan flip-flop 104 receiving clock signal (CLK_A) will provide the launch pulse and the last scan flip-flop 106 receiving clock signal (CLK_B) will provide the capture pulse of the at-speed capture.

When the inverted latched third scan enable signal (SCAN_EN_AB_Ln) controls the clock gate circuit 116 and the latched third scan enable signal (SCAN_EN_AB_L) 306 controls the clock gate circuit 118, the last scan flip-flop 106 receiving the clock signal (CLK_B) will provide the launch pulse and the first scan flip-flop 104 receiving the clock signal (CLK_A) will provide the capture pulse of the at-speed capture.

Thus, full coverage is provided without simultaneously providing the clock signal (CLK_A) 312 and the clock signal (CLK_B) 314 to the endpoint scan flip-flops 104, 106. Further, power management is provided without the use of the SDC files.

In an embodiment, the latched third scan enable signal (SCAN_EN_AB_L) 306 at the third input of the third multiplexer 202 is provided at the output of the third multiplexer 202, in response to the first select signal (SEL_1) 308 and the second select signal (SEL_2) 310 having logic values, respectively of '0' and '1'.

In this embodiment, the latched third scan enable signal (SCAN_EN_AB_L) 306 at the third input of the multiplexer 204 is provided at the output of the fourth multiplexer 204, in response to the first select signal (SEL_1) 308 and the second select signal (SEL_2) 310 having logic values, respectively of '1' and '0'.

Further, the inverted latched third scan enable signal (SCAN_EN_AB_Ln) at the fourth input of the third multiplexer 202 is provided at the output of the third multiplexer 202 in response to the first select signal (SEL_1) 308 and the second select signal (SEL_2) 310 having logic values, respectively of '1' and '0'.

Moreover, the inverted latched third scan enable signal (SCAN_EN_AB_Ln) at the fourth input of the multiplexer 204 is provided at the output of the fourth multiplexer 204 in response to the first select signal (SEL_1) 308 and the second select signal (SEL_2) 310 having logic values, respectively of '0' and '1'—non-limiting.

It should be noted that the selection of the inputs of the multiplexers 202, 204 at its output is not limited to the arrangement or the select signal table provided above. In other embodiments, different arrangements are contemplated.

The clock signal (CLK_A) 312 is provided by the clock gate circuit 116 at the clock terminal (CLK) of the first scan flip-flop 104 in the scan chain 102. The clock signal (CLK_B) 314 is provided by clock gate circuit 118 at the clock terminal (CLK) of the last scan flip-flop 106 in the scan chain 102. It is noted that although the clock signal (OCC_CLK) in controller circuit 200 provides a pair of clock signals (i.e., CLK_A and CLK_B) that are offset in time from each other, it should be appreciated that in other embodiments, additional clock signals (i.e., greater than two) that are similarly offset from each other can analogously be generated from the clock signal (OCC_CLK) during the capture phase of an implementation of the launch-on-capture scan coverage testing.

In the endpoint scan flip-flops 104, 106, in response to the scan-enable signal (e.g., SCAN_EN_A and SCAN_EN_B) being asserted (e.g., logic level high) at the scan enable terminal (SE), data (e.g., test vectors, test patterns, vectors, or patterns) shifts into the scan chain 102 at each clock signal pulse (i.e., corresponding to the clock signal (CLK_A) 312 and the clock signal (CLK_B) 314) at times $T_0$ to $T_1$, $T_1$ to $T_2$, $T_5$ to $T_6$, $T_6$ to $T_7$, $T_7$ to $T_8$, and $T_{11}$ to $T_{12}$.

In response to the scan-enable signal (e.g., SCAN_EN_A and SCAN_EN_B) being de-asserted (e.g., logic level low), the first pulse of the clock signal (i.e., corresponding to the clock signal (CLK_A) 312 and the clock signal (CLK_B) 314) causes the logic circuits with inputs coupled to the scan chain 102 to transition into a step generally referred to as launch at time $T_3$ to $T_4$ for the first scan flip-flop 104 and at time $T_9$ to $T_{10}$ for the last scan flip-flop 106. During the first scan flip-flop 104 launch phase, the clock signal (CLK_B) 314 is not asserted when the clock signal (CLK_A) 312 is asserted. Similarly, during the last scan flip-flop 106 launch phase, the clock signal (CLK_A) 312 is not asserted when the clock signal (CLK_B) 314 is asserted.

The second pulse of the clock signal causes the loading of the outputs of the stimulated logic circuits into flip-flops of the scan chain 102 during the capture phase at times $T_{10}$ to $T_{11}$ for the first scan flip-flop 104 and at times $T_4$ to $T_5$ for the last scan flip-flop 106. An at-speed capture includes two clock pulses. The first pulse corresponds to a launch pulse (or launch phase) and the second pulse corresponds to the capture pulse (or capture phase). During the capture phase of the first scan flip-flop 104, the clock signal (CLK_B) 314 is not asserted when the clock signal (CLK_A) 312 is asserted. Similarly, during the last scan flip-flop 106 capture phase, the clock signal (CLK_A) 312 is not asserted when the clock signal (CLK_B) 314 is asserted. The data shifted out at times $T_5$ to $T_6$, $T_6$ to $T_7$, $T_7$ to $T_8$, and $T_{11}$ to $T_{12}$ are then evaluated for faults.

Thus, embodiments of this disclosure provide separate clock signals (i.e., CLK_A and CLK_B) to the endpoint scan flip-flops 104, 106 of the scan chain 102, instead of using a common clock signal at the clock terminal, such as the one in gate control circuit 100. Effectively, the controller circuit 200 provides a hardware implementation where the launch or capture clock is split into two at-speed pulses for the launch-on-capture implementation. This solution, thus, requires less power than the normal implementation of at-speed ATPG test patterns (i.e., without a power budget approach) while providing more scan coverage.

Advantageously, the embodiments disclosed herein provide a hardware implementation that reduces power consumption, increases scan coverage, and reduces test patterns compared to a software-only implementation. In implementing the controller circuit 200, multi-cycle paths (MCPs) are handled using hardware circuitry that overrides the timing constraints and exceptions provided by the Synopsys Design Constraints (SDC) file while reducing the efforts required to provide scan coverage through the ATPG tools.

Although controller circuit 200 can be used as a hardware-only solution to reduce power consumption and increase scan coverage, it is noted that a hybrid hardware and software solution based on the embodiments of this disclosure can also advantageously reduce power consumption and increase scan coverage. In embodiments, the hardware solution may receive priority (i.e., preference) over the software solution, resulting in a reduction of errors.

A hybrid hardware and software solution, while utilizing the timing constraints and exceptions provided by, for example, the SDC file, can be helpful to achieve high scan coverage when compared to a software-only solution that utilizes the SDC file, which typically results in the generating of incorrect test patterns.

The controller circuit 200, in combination with a software solution, such as power gating, can be helpful to achieve reduced power consumption with increased scan coverage without relying on test pattern inflation typical of a hardware-only solution. For example, in embodiments, software solutions can be used in debug mode, resulting in reduced coverage but at a much-reduced power consumption (i.e., minimal coverage for debugging with minimal power consumption).

In embodiments, the scan coverage for multi-cycle paths can be attained in subsequent passes with a clock signal (OCC_CLK) 302 of two pulses (i.e., CLK_A and CLK_B).

Figure 4:
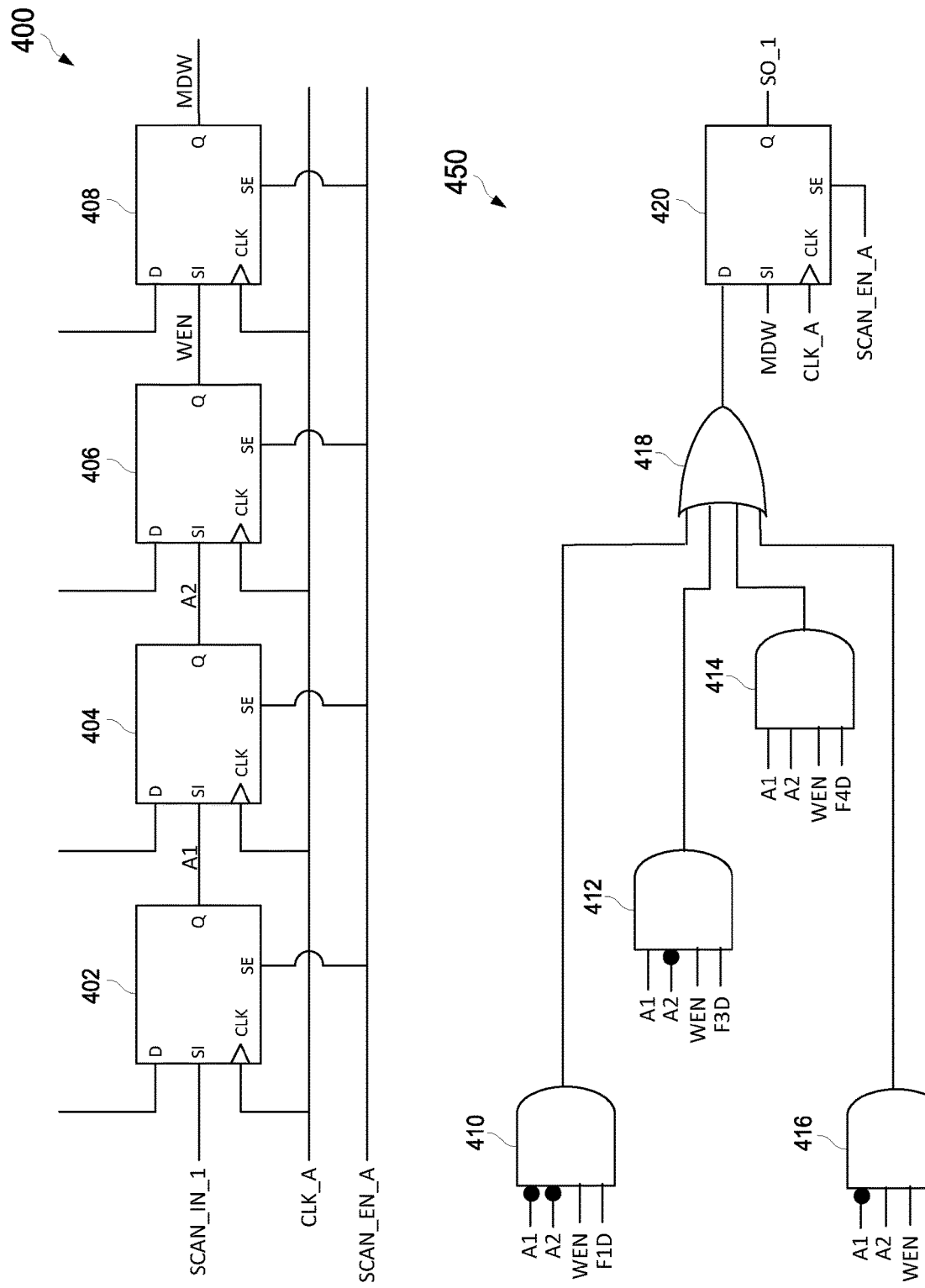
FIGS. 4 and 5 illustrate block diagrams of an example implementation of the embodiments of the disclosure in a two-cycle path (i.e., multi-cycle path)

In embodiments where the start and endpoint flip-flops in a multi-cycle path receive a clock signal from different clock gate circuits (e.g., scan flip-flop 420 in FIG. 4 receiving a third clock signal (CLK_C)), the scan coverage can be attained in a single pass with a clock signal (OCC_CLK) 302 with greater than two pulses (i.e., CLK_A CLK_B, . . . , CLK_N).

In embodiments, the additional logic is generically added before every clock gate to achieve a universal reduction in power consumption while increasing scan coverage in the integrated circuit without specific knowledge or understanding of the circuit design. For example, each functional IP clock gate can have a single pulse, which can be randomly chosen, providing additional scan coverage if any multi-cycle or false paths come along the test path.

In some embodiments, the additional logic is selectively added in multi-cycle paths, false paths, or both, using the information provided in, for example, the timing exceptions file (e.g., the Synopsys Design Constraints file). For example, the implementation of the disclosed embodiments can be based on the specific knowledge or understanding of the design microarchitecture (e.g., new IP, new system-on-chip) or from the multi-cycle or false paths of the integrated circuit used in the integrated circuits of the same family, derivatives, or re-use of IP.

In embodiments, scan coverage increases as other valid single-cycle paths, which share combination logic with multi-cycle or false paths, are not masked and properly targeted for at-speed scan coverage. This contrasts with the conventional solutions where valid single-cycle paths, which share combination logic with the multi-cycle paths, are checked at lower speeds (i.e., corresponding to the frequency of the multi-cycle path coverage).

In embodiments, at-speed LBIST is available without introducing delays on the functional data paths, while power consumption is reduced.

Multiple ATPG passes are avoided in embodiments, and in LBIST, additional valid paths (e.g., multi-cycle paths) are made available for observability. As such, the number of test insertion points is reduced with a smaller number of test patterns for achieving similar or increased scan coverage with more deductible logic.

In embodiments, capture power is reduced with reduced test patterns without the conventional need to control the functional logic of clock terminals in accordance with the power budget approach and the control of multi-cycle paths in multi-million gate designs, based on the information provided in, for example, the timing exceptions file (e.g., the Synopsys Design Constraints file).

In embodiments, multi-cycle path scan coverage is accomplished within the same ATPG pass in accordance with the hardware solution provided herein and the information provided in, for example, the timing exceptions file (e.g., the Synopsys Design Constraints file).

In embodiments, capture power is reduced without providing a power budget to the ATPG tool, which the ATPG tool conventionally used to control the functional logic of the clock gates in multi-million gate designs.

Thus, embodiments of this disclosure, advantageously, reduce the efforts needed to produce the ATPG test patterns, reduce the number of ATPG test patterns, reduce test time, and reduce capture power while increasing scan coverage at correct at-speed frequencies.

Figure 5:
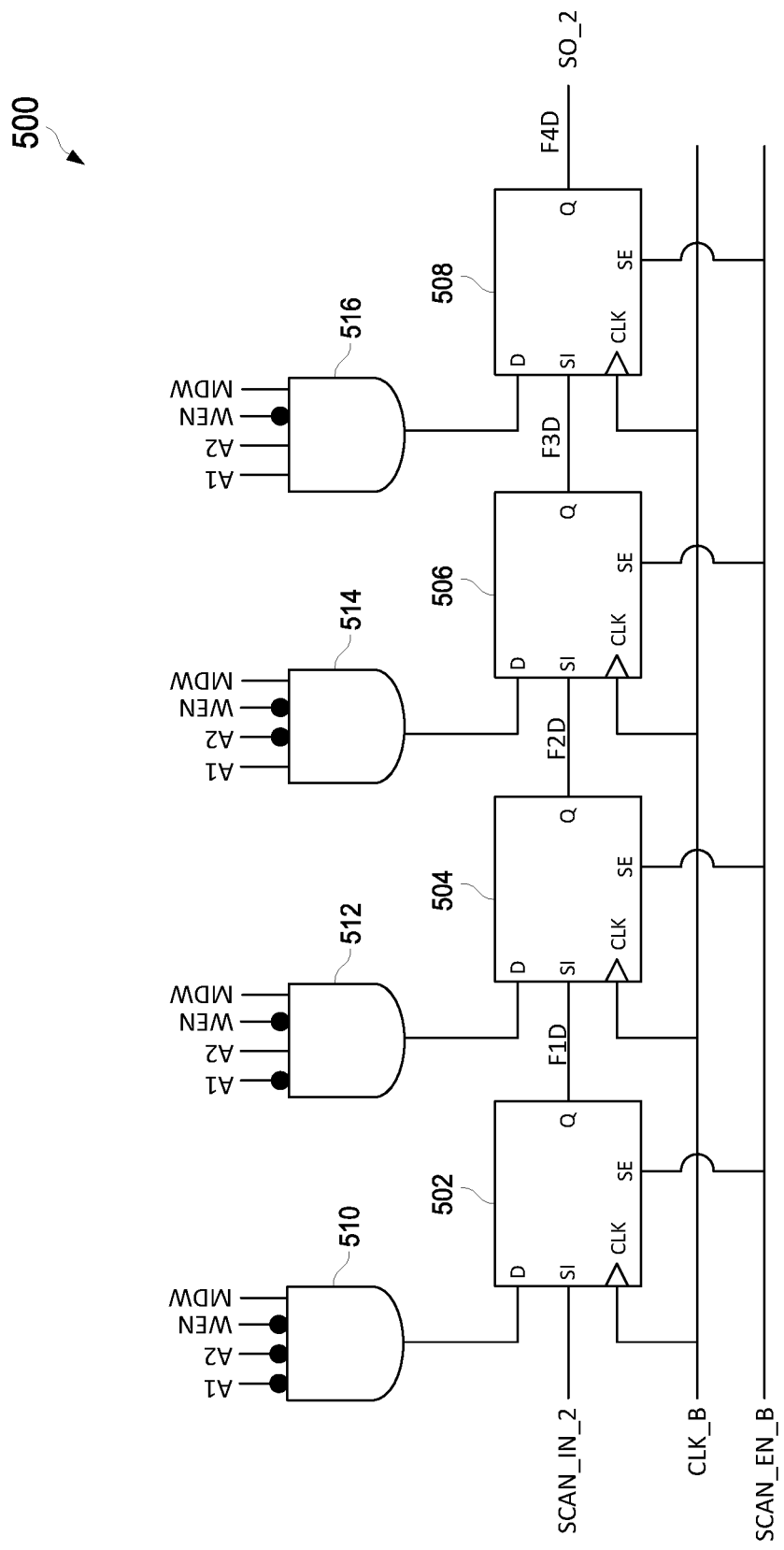

FIGS. 4 and 5 illustrate block diagrams of an example implementation of the embodiments of the disclosure in a two-cycle path (i.e., multi-cycle path). FIGS. 4 and 5 illustrate a write data path 400, a first-in-first-out (FIFO) path 500, and read data path 450, which can be arranged as a single embodiment.

In a first at-speed capture, the write data path 400 is the initiating path and the FIFO path 500 is the target path. As such, the scan enable terminal (SE) of scan flip-flops 402, 404, 406, and 408 is coupled to the first scan enable signal (SCAN_EN_A) and the scan enable terminal (SE) of scan flip-flops 502, 504, 506, and 508 is coupled to the second scan enable signal (SCAN_EN_B). Further, the clock terminal (CLK) of scan flip-flops 402, 404, 406, and 408 is coupled to the clock signal (CLK_A) provided by the controller circuit 200 and the clock terminal (CLK) of scan flip-flops 502, 504, 506, and 508 is coupled to the clock signal (CLK_B). Thus, the scan flip-flops in the write data path 400 have independent scan enable handling and clock gate control from the scan flip-flops in the FIFO path 500.

In the first at-speed capture, the scan flip-flops in the write data path 400 in a launch-on-capture implementation receives only the launch clock pulse and the scan flip-flops in the FIFO path 500 receives only the capture clock pulse (e.g., times $T_3$ to $T_4$ for the scan flip-flops in the write data path 400 and the times $T_4$ to $T_5$ for the scan flip-flops in the FIFO path 500). Advantageously, power consumption is reduced because the clock signal is not provided simultaneously to the scan flip-flops in the write data path 400 and the FIFO path 500, while maintaining scan coverage.

In a second at-speed capture, the FIFO path 500 is the initiating path and the read data path 450 is the target. As such, the scan enable terminal (SE) of scan flip-flops 502, 504, 506, and 508 is coupled to the second scan enable signal (SCAN_EN_B) and the scan enable terminal (SE) of the scan flip-flop 420 is coupled to the first scan enable signal (SCAN_EN_A). Further, the clock terminal (CLK) of scan flip-flops 502, 504, 506, and 508 is coupled to the clock signal (CLK_B) provided by the controller circuit 200 and the clock terminal (CLK) of the scan flip-flop 420 is coupled to the clock signal (CLK_A). Thus, the scan flip-flops in the FIFO path 500 have independent scan enable handling and clock gate control from the scan flip-flop 420 in the read data path 450.

In the second at-speed capture, the scan flip-flops in the FIFO path 500 in a launch-on-capture implementation receives only the launch clock pulse and the scan flip-flop 420 in the read data path 450 receives only the capture clock pulse (e.g., times $T_9$ to $T_{10}$ for the scan flip-flops in the FIFO path 500 and the times $T_{10}$ to $T_{11}$ for the scan flip-flop 420 in the read data path 450). Advantageously, power consumption is reduced because the clock signal is not provided simultaneously to the scan flip-flops in the FIFO path 500 and the read data path 450, while maintaining scan coverage.

It is noted that the select enable terminal (SE) and the clock terminal (CLK) of the scan flip-flop 420 can be coupled to, respectively, a sixth scan enable signal (e.g., SCAN_EN_E—assuming that the first select signal (SEL_1) and the second select signal (SEL_2) are set to a third scan enable signal (SCAN_EN_C) and a fourth scan enable signal (SCAN_EN_D), respectively) and a clock signal (CLK_C) by expanding the controller circuit 200 to generate a third clock signal (CLK_C) from the clock signal (OCC_CLK) and a functional logic AND combination of the first scan enable signal (SCAN_EN_A), the second scan enable signal (SCAN_EN_B), and the sixth scan enable signal (SCAN_EN_E). Thus, a hardware solution with a controller circuit 200 having greater than two shifted clock pulses is similarly contemplated.

The write data path 400 includes a first scan flip-flop 402, a second scan flip-flop 404, a third scan flip-flop 406, and a fourth scan flip-flop 408, which may (or may not) be arranged as shown. The FIFO path 500, which is coupled to the write data path 400, includes a first scan flip-flop 502, a second scan flip-flop 504, a third scan flip-flop 506, and a fourth scan flip-flop 508, which may (or may not) be arranged as shown. The write data path 400 and the FIFO path 500 may include additional scan flip-flops (not shown). Thus, the number of scan flip-flops in FIGS. 4 and 5 are non-limiting, and fewer or greater are similarly contemplated.

In embodiments, the data terminal (D) of scan flip-flops 402, 404, 406, and 408 is configured to receive a data signal from, for example, a test controller.

The first scan flip-flop 402 is configured to receive, for example, a first serially shifted test pattern (SCAN_IN_1) at the scan in terminal (SI), which is propagated through the scan chain. In embodiments, the test patterns are applied at the scan in terminal (SI) one bit at a time and synchronized with the clock signal (CLK_A). The shifted-in test patterns are observed at the output terminal (Q) of the first scan flip-flop 402 and provided as a first write data address (A1) at the scan in terminal (SI) of the second scan flip-flop 404. The shifted-in test patterns are next observed at the output terminal (Q) of the second scan flip-flop 404 and provided as a second write data address (A2) at the scan in terminal (SI) of the third scan flip-flop 406. The shifted-in test patterns are observed at the output terminal (Q) of the third scan flip-flop 406 and provided as a write enable (WEN) at the scan in terminal (SI) of the fourth scan flip-flop 408. Finally, the shifted-in test patterns are observed at the output terminal (Q) of the fourth scan flip-flop 408 as the write data (MDW).

The data terminal (D) of the first scan flip-flop 502 is coupled to an output terminal of a first four-input AND gate 510. The first four-input AND gate 510 has a first, second, third, and fourth input coupled to, respectively, the first write data address (A1), the second write data address (A2), the write enable (WEN), and the write data (MDW). In response to the first write data address (A1) and the second write data address (A2), respectively, being a logic '0' and '0', and the write enable (WEN) being a logic '0', the write data (MDW) is provided at the input terminal (D) of the first scan flip-flop 502.

The data terminal (D) of the second scan flip-flop 504 is coupled to an output terminal of a second four-input AND gate 512. The second four-input AND gate 512 has a first, second, third, and fourth input coupled to, respectively, the first write data address (A1), the second write data address (A2), the write enable (WEN), and the write data (MDW). In response to the first write data address (A1) and the second write data address (A2), respectively, being a logic '0' and '1', and the write enable (WEN) being a logic '0', the write data (MDW) is provided at the input terminal (D) of the second scan flip-flop 504.

The data terminal (D) of the third scan flip-flop 506 is coupled to an output terminal of a third four-input AND gate 514. The third four-input AND gate 514 has a first, second, third, and fourth input coupled to, respectively, the first write data address (A1), the second write data address (A2), the write enable (WEN), and the write data (MDW). In response to the first write data address (A1) and the second write data address (A2), respectively, being a logic '1' and '0', and the write enable (WEN) being a logic '0', the write data (MDW) is provided at the input terminal (D) of the third scan flip-flop 506.

The data terminal (D) of the fourth scan flip-flop 508 is coupled to an output terminal of a fourth four-input AND gate 516. The fourth four-input AND gate 516 has a first, second, third, and fourth input coupled to, respectively, the first write data address (A1), the second write data address (A2), the write enable (WEN), and the write data (MDW). In response to the first write data address (A1) and the second write data address (A2), respectively, being a logic '1' and '1', and the write enable (WEN) being a logic '0', the write data (MDW) is provided at the input terminal (D) of the fourth scan flip-flop 508.

In embodiments, the scan flip-flops 402, 404, 406, 408, 502, 504, 506, and 508 with different scan enable signals (i.e., SCAN_EN_A and SCAN_EN_B) are mixed in the same scan chain. For example, (i) first scan flip-flop 402 and first scan flip-flop 502, (ii) second scan flip-flop 404 and second scan flip-flop 504, (iii) third scan flip-flop 406 and third scan flip-flop 506, and (iv) fourth scan flip-flop 408 and fourth scan flip-flop 508, each can be endpoints in a respective scan chain. In embodiments, scan flip-flops 402, 404, 406, and 408 are the first scan flip-flops in a respective scan chain. In embodiments, scan flip-flops 502, 504, 506, and 508 are the last scan flip-flops in a respective scan chain.

The first scan flip-flop 502 is configured to receive, for example, a second serially shifted test pattern (SCAN_IN_2) at the scan in terminal (SI), which is propagated through the scan chain. In embodiments, the test patterns are applied at the scan in terminal (SI) one bit at a time and synchronized with the clock signal (CLK_B). The shifted-in test patterns are observed at the output terminal (Q) of the first scan flip-flop 502 and provided as a first data (F1D) at the scan in terminal (SI) of the second scan flip-flop 504. The shifted-in test patterns are next observed at the output terminal (Q) of the second scan flip-flop 504 and provided as a second data (F2D) at the scan in terminal (SI) of the third scan flip-flop 506. The shifted-in test patterns are observed at the output terminal (Q) of the third scan flip-flop 506 and provided as a third data (F3D) at the scan in terminal (SI) of the fourth scan flip-flop 508. Finally, the shifted-in test patterns are observed at the output terminal (Q) of the fourth scan flip-flop 508 as the fourth data (F4D).

In embodiments, a data terminal (D) of a scan flip-flop 420 in the read data path 450, coupled to the write data path 400 and FIFO path 500, is coupled to an output terminal of a four-input OR gate 418. The clock terminal (CLK), the scan enable terminal (SE), and the scan in terminal (SI) of the scan flip-flop 420 are, respectively, coupled to the clock signal (CLK_A), the first scan enable signal (SCAN_EN_A), and the write data (MDW). The scan flip-flop 420 is configured to provide a latched output signal (SO_1) at the output terminal (Q).

The first four-input AND gate 410 has a first, second, third, and fourth input coupled to, respectively, the first write data address (A1), the second write data address (A2), the write enable (WEN), and the first data (F1D). In response to the first write data address (A1) and the second write data address (A2), respectively, being a logic '0' and '0', and the write enable (WEN) being a logic '1' (i.e., read enable being asserted), the first data (F1D) is provided at the first input of the four-input OR gate 418.

The second four-input AND gate 412 has a first, second, third, and fourth input coupled to, respectively, the first write data address (A1), the second write data address (A2), the write enable (WEN), and the third data (F3D). In response to the first write data address (A1) and the second write data address (A2), respectively, being a logic '1' and '0', and the write enable (WEN) being a logic '1' (i.e., read enable being asserted), the third data (F3D) is provided at the second input of the four-input OR gate 418.

The third four-input AND gate 414 has a first, second, third, and fourth input coupled to, respectively, the first write data address (A1), the second write data address (A2), the write enable (WEN), and the fourth data (F4D). In response to the first write data address (A1) and the second write data address (A2), respectively, being a logic '1' and '1', and the write enable (WEN) being a logic '1' (i.e., read enable being asserted), the fourth data (F4D) is provided at the third input of the four-input OR gate 418.

The fourth four-input AND gate 416 has a first, second, third, and fourth input coupled to, respectively, the first write data address (A1), the second write data address (A2), the write enable (WEN), and the second data (F2D). In response to the first write data address (A1) and the second write data address (A2), respectively, being a logic '0' and '1', and the write enable (WEN) being a logic '1' (i.e., read enable being asserted), the second data (F2D) is provided at the fourth input of the four-input OR gate 418.

Figure 6:
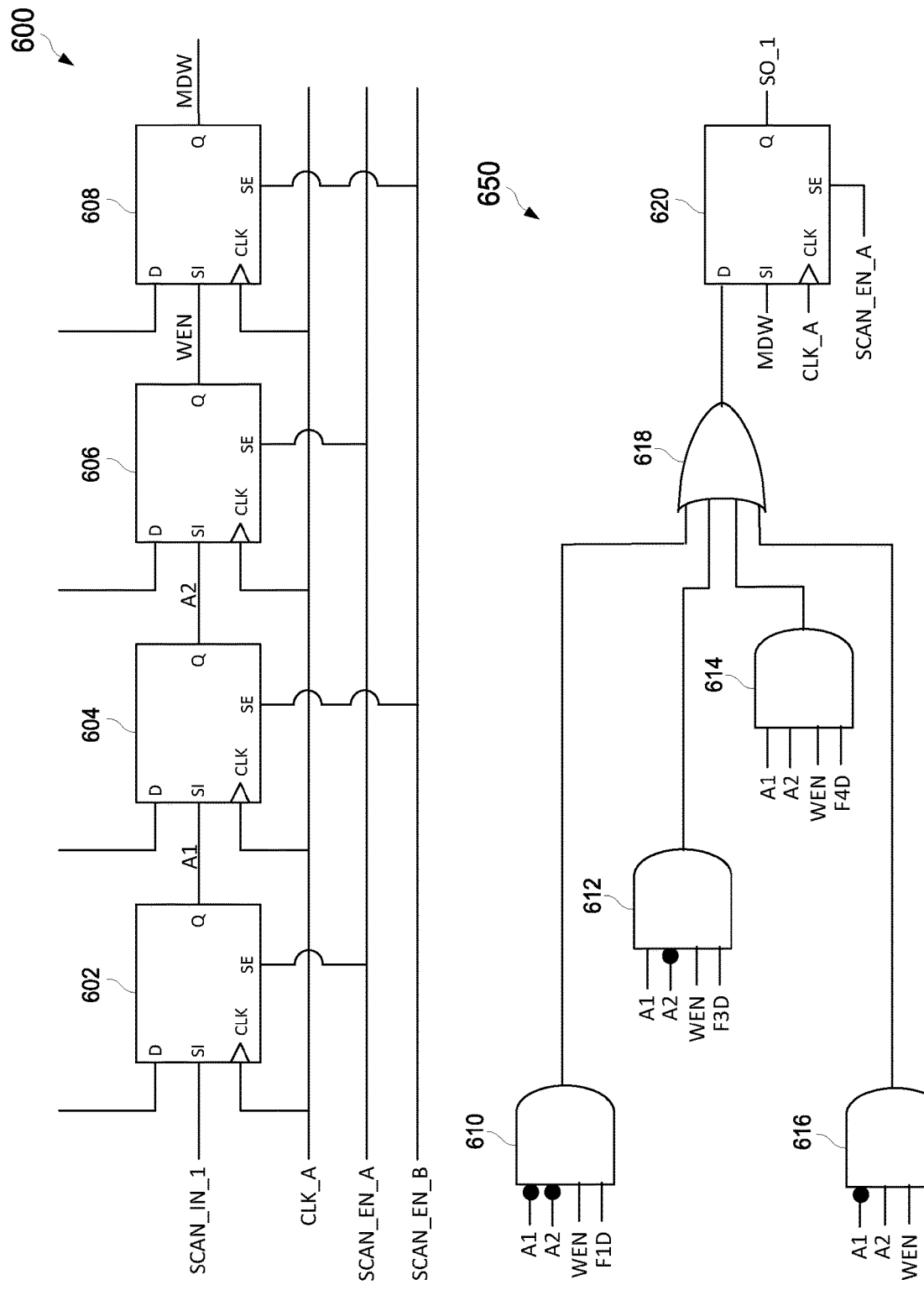
FIGS. 6 and 7 illustrate block diagrams of an example implementation of the embodiments of the disclosure in a two-cycle path (multi-cycle path)
Figure 7:
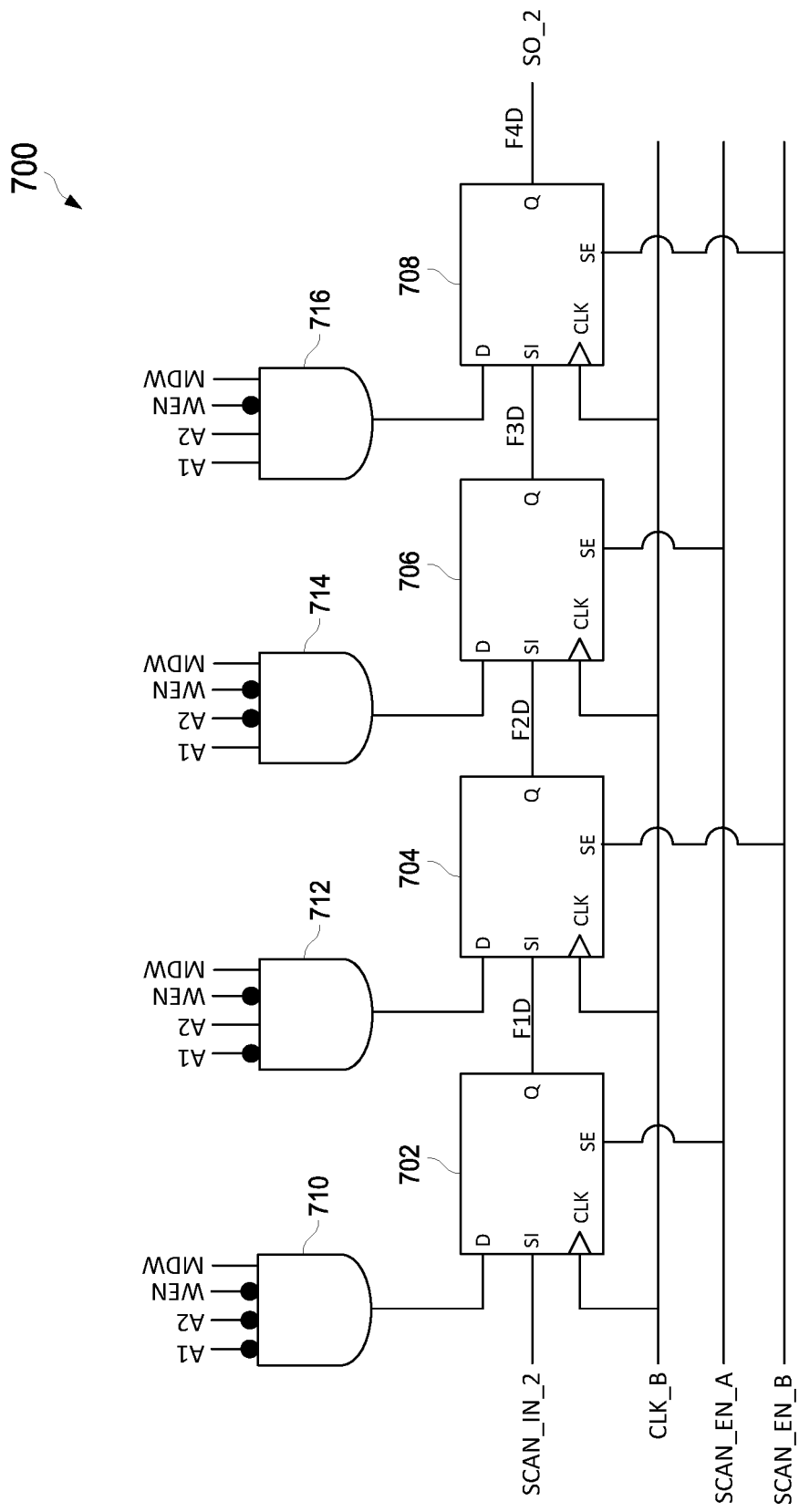

FIGS. 6 and 7 illustrate block diagrams of an example implementation of the embodiments of the disclosure in a two-cycle path (multi-cycle path). FIGS. 6 and 7 illustrate a write data path 600, a first-in-first-out (FIFO) path 700, and read data path 650, which can be arranged as a single embodiment.

In a first at-speed capture, the write data path 600 is the initiating path and the FIFO path 700 is the target path. As such, the scan enable terminal (SE) of scan flip-flops 602, 702, 606, and 706 is coupled to the first scan enable signal (SCAN_EN_A) and the scan enable terminal (SE) of scan flip-flops 704, 604, 708, and 608 is coupled to the second scan enable signal (SCAN_EN_B). Further, the clock terminal (CLK) of scan flip-flops 602, 604, 606, and 608 is coupled to the clock signal (CLK_A) provided by the controller circuit 200 and the clock terminal (CLK) of scan flip-flops 702, 704, 706, and 708 is coupled to the clock signal (CLK_B). Thus, alternate scan flip-flops in the write data path 600 have independent scan enable handling from the alternate scan flip-flops in the FIFO path 700.

In embodiments, the clock terminals (CLK) of the scan flip-flops 602, 604, 606, 608, and 620 are coupled to the output of the clock gate circuit 116, and the clock terminals (CLK) of the scan flip-flops 702, 704, 706, and 708 are coupled to the output of the clock gate circuit 118. The first select signal (SEL_1) and the second select signal (SEL_2) is set to a fourth scan enable signal (SCAN_EN_C) and a fifth scan enable signal (SCAN_EN_D), respectively.

In the first at-speed capture, the scan flip-flops in the write data path 600 in a launch-on-capture implementation receives only the launch clock pulse and the scan flip-flops in the FIFO path 700 receives only the capture clock pulse (e.g., time $T_3$ to $T_4$ for the scan flip-flops in the write data path 600 and the time $T_4$ to $T_5$ for the scan flip-flops in the FIFO path 700). Advantageously, power consumption is reduced because the clock signal is not provided simultaneously to the scan flip-flops in the write data path 600 and the FIFO path 700, while maintaining scan coverage.

In a second at-speed capture, the FIFO path 700 is the initiating path and the read data path 650 is the target. As such, the scan enable terminal (SE) of scan flip-flops 704 and 708 is coupled to the second scan enable signal (SCA- N_EN_B) and the scan enable terminal (SE) of the scan flip-flops 702, 706, and 620 is coupled to the first scan enable signal (SCAN_EN_A). Further, the clock terminal (CLK) of scan flip-flops 702, 704, 706, and 708 is coupled to the clock signal (CLK_B) provided by the controller circuit 200 and the clock terminal (CLK) of the fifth scan flip-flop 620 is coupled to the clock signal (CLK_A). Thus, the alternate scan flip-flops in the FIFO path 700 have independent scan enable handling and scan flip-flops in the FIFO path 700 have independent clock gate control from the scan flip-flop 620 in the read data path 650.

It is noted that the select enable terminal (SE) and the clock terminal (CLK) of the scan flip-flop 620 can be coupled to, respectively, a sixth scan enable signal (SCAN_EN_E) and a clock signal (CLK_C) by expanding the controller circuit 200 to generate a third clock signal (CLK_C) from the clock signal (OCC_CLK) and a functional logic AND combination of the first scan enable signal (SCAN_EN_A), the second scan enable signal (SCAN_EN_B), and the sixth scan enable signal (SCAN_EN_E).

The write data path 600 includes a first scan flip-flop 602, a second scan flip-flop 604, a third scan flip-flop 606, and a fourth scan flip-flop 608, which may (or may not) be arranged as shown. The FIFO path 700, which is coupled to the write data path 600, includes a first scan flip-flop 702, a second scan flip-flop 704, a third scan flip-flop 706, and a fourth scan flip-flop 708, which may (or may not) be arranged as shown. The write data path 600 and FIFO path 700 may include additional scan flip-flops (not shown). Thus, the number of scan flip-flops in FIGS. 6 and 7 are non-limiting, and fewer or greater are similarly contemplated.

In embodiments, the data terminal (D) of scan flip-flops 602, 604, 606, and 608 is configured to receive a data signal from, for example, a test controller.

In embodiments, the clock terminal (CLK) of scan flip-flops 602, 604, 606, and 608 is coupled to the clock signal (CLK_A) generated by the phase-locked loop 112 and on-chip clock generator 114.

In embodiments, the scan enable terminal (SE) of scan flip-flops 602, 606 is coupled to the first scan enable signal (SCAN_EN_A). The scan enable terminal (SE) of scan flip-flops 604, 608 is coupled to the second scan enable signal (SCAN_EN_B).

The first scan flip-flop 602 is configured to receive, for example, a first serially shifted test pattern (SCAN_IN_1) at the scan in terminal (SI), which is propagated through the scan chain. In embodiments, the test patterns are applied at the scan in terminal (SI) one bit at a time and synchronized with the clock signal (CLK). The shifted-in test patterns are observed at the output terminal (Q) of the first scan flip-flop 602 and provided as a first write data address (A1) at the scan in terminal (SI) of the second scan flip-flop 604. The shifted-in test patterns are next observed at the output terminal (Q) of the second scan flip-flop 604 and provided as a second write data address (A2) at the scan in terminal (SI) of the third scan flip-flop 606. The shifted-in test patterns are observed at the output terminal (Q) of the third scan flip-flop 606 and provided as a write enable (WEN) at the scan in terminal (SI) of the fourth scan flip-flop 608. Finally, the shifted-in test patterns are observed at the output terminal (Q) of the fourth scan flip-flop 608 as the write data (MDW).

The data terminal (D) of the first scan flip-flop 702 is coupled to an output terminal of a first four-input AND gate 710. The first four-input AND gate 710 has a first, second, third, and fourth input coupled to, respectively, the first write data address (A1), the second write data address (A2), the write enable (WEN), and the write data (MDW). In response to the first write data address (A1) and the second write data address (A2), respectively, being a logic '0' and '0', and the write enable (WEN) being a logic '0', the write data (MDW) is provided at the input terminal (D) of the first scan flip-flop 702.

The data terminal (D) of the second scan flip-flop 704 is coupled to an output terminal of a second four-input AND gate 712. The second four-input AND gate 712 has a first, second, third, and fourth input coupled to, respectively, the first write data address (A1), the second write data address (A2), the write enable (WEN), and the write data (MDW). In response to the first write data address (A1) and the second write data address (A2), respectively, being a logic '0' and '1', and the write enable (WEN) being a logic '0', the write data (MDW) is provided at the input terminal (D) of the second scan flip-flop 704.

The data terminal (D) of the third scan flip-flop 706 is coupled to an output terminal of a third four-input AND gate 714. The third four-input AND gate 714 has a first, second, third, and fourth input coupled to, respectively, the first write data address (A1), the second write data address (A2), the write enable (WEN), and the write data (MDW). In response to the first write data address (A1) and the second write data address (A2), respectively, being a logic '1' and '0', and the write enable (WEN) being a logic '0', the write data (MDW) is provided at the input terminal (D) of the third scan flip-flop 706.

The data terminal (D) of the fourth scan flip-flop 708 is coupled to an output terminal of a fourth four-input AND gate 716. The fourth four-input AND gate 716 has a first, second, third, and fourth input coupled to, respectively, the first write data address (A1), the second write data address (A2), the write enable (WEN), and the write data (MDW). In response to the first write data address (A1) and the second write data address (A2), respectively, being a logic '1' and '1', and the write enable (WEN) being a logic '0', the write data (MDW) is provided at the input terminal (D) of the fourth scan flip-flop 708.

In embodiments, the clock terminal (CLK) of scan flip-flops 702, 704, 706, and 708 is coupled to the clock signal (CLK_B) generated by the phase-locked loop 112 and on-chip clock generator 114.

In embodiments, the scan enable terminal (SE) of scan flip-flops 702, 706 is coupled to the first scan enable signal (SCAN_EN_A). The scan enable terminal (SE) of scan flip-flops 704, 708 is coupled to the second scan enable signal (SCAN_EN_B).

In embodiments, the scan flip-flops 602, 604, 606, 608, 702, 704, 706, and 708 with different scan enable signals (i.e., SCAN_EN_A and SCAN_EN_B) are mixed in the same scan chain. For example, (i) first scan flip-flop 602 and first scan flip-flop 702, (ii) second scan flip-flop 604 and second scan flip-flop 704, (iii) third scan flip-flop 606 and third scan flip-flop 706, and (iv) fourth scan flip-flop 608 and fourth scan flip-flop 708, each can be endpoints in a respective scan chain. In embodiments, scan flip-flops 602, 604, 606, and 608 are the first scan flip-flops in a respective scan chain. In embodiments, scan flip-flops 702, 704, 706, and 708 are the last scan flip-flops in a respective scan chain.

The first scan flip-flop 702 is configured to receive, for example, a second serially shifted test pattern (SCAN_IN_2) at the scan in terminal (SI), which is propagated through the scan chain. In embodiments, the test patterns are applied at the scan in terminal (SI) one bit at a time and synchronized with the clock signal (CLK_B). The shifted-in test patterns are observed at the output terminal (Q) of the first scan flip-flop 702 and provided as a first data (F1D) at the scan in terminal (SI) of the second scan flip-flop 704. The shifted-in test patterns are next observed at the output terminal (Q) of the second scan flip-flop 704 and provided as a second data (F2D) at the scan in terminal (SI) of the third scan flip-flop 706. The shifted-in test patterns are observed at the output terminal (Q) of the third scan flip-flop 706 and provided as a third data (F3D) at the scan in terminal (SI) of the fourth scan flip-flop 708. Finally, the shifted-in test patterns are observed at the output terminal (Q) of the fourth scan flip-flop 708 as the fourth data (F4D).

In embodiments, a data terminal (D) of a fifth scan flip-flop 620 in the read data path 650, coupled to the write data path 600 and FIFO path 700, is coupled to an output terminal of a four-input OR gate 618. The clock terminal (CLK), the scan enable terminal (SE), and the scan in terminal (SI) of the fifth scan flip-flop 620 are, respectively, coupled to the clock signal (CLK_A), the first scan enable signal (SCAN_EN_A), and the write data (MDW). The fifth scan flip-flop 620 is configured to provide a latched output signal (SO_1) at the output terminal (Q).

The first four-input AND gate 610 has a first, second, third, and fourth input coupled to, respectively, the first write data address (A1), the second write data address (A2), the write enable (WEN), and the first data (F1D). In response to the first write data address (A1) and the second write data address (A2), respectively, being a logic '0' and '0', and the write enable (WEN) being a logic '1' (i.e., read enable being asserted), the first data (F1D) is provided at the first input of the four-input OR gate 618.

The second four-input AND gate 612 has a first, second, third, and fourth input coupled to, respectively, the first write data address (A1), the second write data address (A2), the write enable (WEN), and the third data (F3D). In response to the first write data address (A1) and the second write data address (A2), respectively, being a logic '1' and '0', and the write enable (WEN) being a logic '1' (i.e., read enable being asserted), the third data (F3D) is provided at the second input of the four-input OR gate 618.

The third four-input AND gate 614 has a first, second, third, and fourth input coupled to, respectively, the first write data address (A1), the second write data address (A2), the write enable (WEN), and the fourth data (F4D). In response to the first write data address (A1) and the second write data address (A2), respectively, being a logic '1' and '1', and the write enable (WEN) being a logic '1' (i.e., read enable being asserted), the fourth data (F4D) is provided at the third input of the four-input OR gate 618.

The fourth four-input AND gate 616 has a first, second, third, and fourth input coupled to, respectively, the first write data address (A1), the second write data address (A2), the write enable (WEN), and the second data (F2D). In response to the first write data address (A1) and the second write data address (A2), respectively, being a logic '0' and '1', and the write enable (WEN) being a logic '1' (i.e., read enable being asserted), the second data (F2D) is provided at the fourth input of the four-input OR gate 618.

In embodiments, the hardware implementations, as disclosed, may be combined with a software solution such as power gating. Although, it should be appreciated that a hardware-only implementation may also be contemplated.

Figure 8:
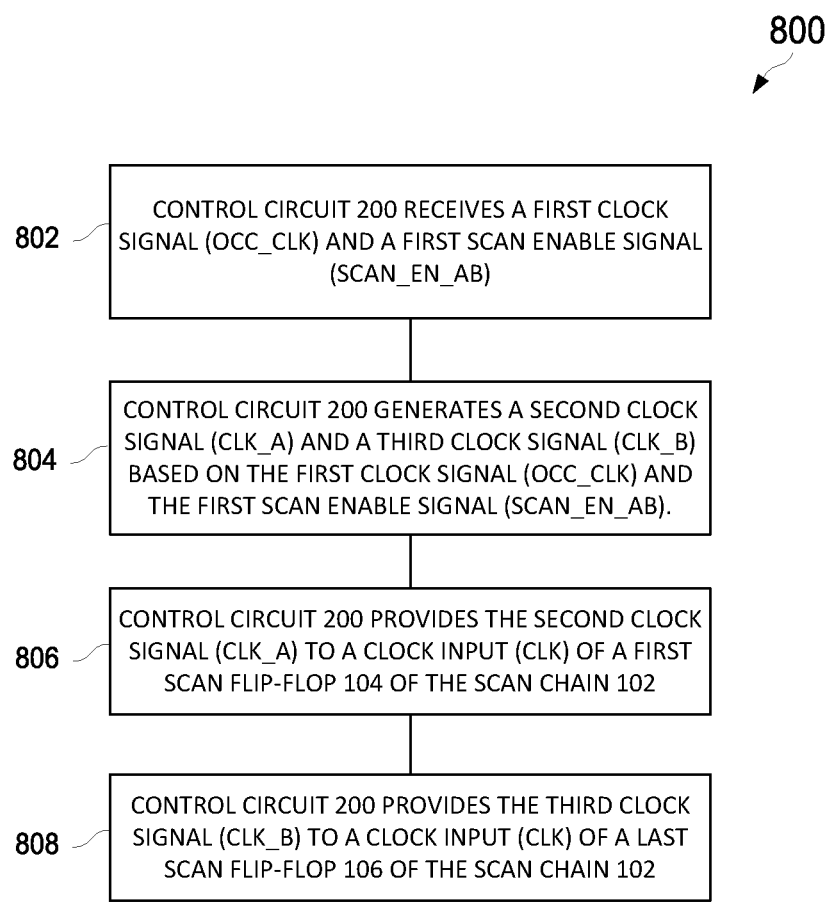
FIG. 8 illustrates a flow chart of an embodiment method for testing a scan chain in an integrated circuit.

FIG. 8 illustrates a flow chart of an embodiment method 800 for testing a scan chain 102 in an integrated circuit. At step 802, the controller circuit 200 receives a first clock signal (OCC_CLK) and a first scan enable signal (SCAN_EN_AB).

At step 804, the controller circuit 200 generates a second clock signal (CLK_A) and a third clock signal (CLK_B) based on the first clock signal (OCC_CLK) and the first scan enable signal (SCAN_EN_AB). The third clock signal (CLK_B) is delayed by a clock pulse from the second clock signal (CLK_A). The first clock signal (OCC_CLK), the second clock signal (CLK_A), and the third clock signal (CLK_B) have the same duty cycle.

At step 806, the controller circuit 200 provides the second clock signal (CLK_A) to a clock terminal (CLK) of a first scan flip-flop 104 of the scan chain 102. A scan enable input (SE) of the first scan flip-flop 104 is configured to receive a second scan enable signal (SCAN_EN_A).

At step 808, the controller circuit 200 provides the third clock signal (CLK_B) to a clock terminal (CLK) of a last scan flip-flop 106 of the scan chain 102. A scan enable input (SE) of the last scan flip-flop 106 is configured to receive a third scan enable signal (SCAN_EN_B).

It is noted that all steps outlined in the flow chart of method 800 are not necessarily required and can be optional. Further, changes to the arrangement of the steps, removal of one or more steps and path connections, and addition of steps and path connections are similarly contemplated.

A first aspect relates to a control circuit that includes a first flip-flop, a first NOT gate, a first multiplexer, a second multiplexer, a first OR gate, a second OR gate, and a first clock gate circuit. A data terminal of the first flip-flop configured to receive a first scan enable signal, a clock terminal of the first flip-flop configured to receive a first clock signal, and an output terminal of the first flip-flop configured to provide a first latched scan enable signal. The first NOT gate is configured to receive the first latched scan enable signal and provide an inverted first latched scan enable signal. The first input of the first multiplexer configured to receive a first test control signal, a second input of the first multiplexer configured to receive a second test control signal, a third input of the first multiplexer configured to receive the first latched scan enable signal, a fourth input of the first multiplexer configured to receive the inverted first latched scan enable signal, a first select terminal of the first multiplexer configured to receive a first select signal, and a second select terminal of the first multiplexer configured to receive a second select signal. A first input of the second multiplexer configured to receive a functional logic signal, a second input of the second multiplexer configured to receive an output signal from the first multiplexer in accordance with the first select signal and the second select signal, and a select terminal of the second multiplexer configured to receive a third test control signal. A first input of the first OR gate is configured to receive the first scan enable signal, and a second input of the first OR gate is configured to receive a fourth test control signal. A first input of the second OR gate coupled to an output of the first OR gate, a second input of the second OR gate configured to receive an output signal from the second multiplexer in accordance with the third test control signal. The first clock gate circuit has a first latch coupled to a first AND gate, a data terminal of the first latch coupled to an output of the second OR gate, and a gated negative-set terminal of the first latch configured to receive the first clock signal. The first clock gate circuit is configured to provide a second clock signal.

In a first implementation form of the control circuit according to the first aspect as such, the first clock gate circuit is configured to provide the second clock signal to a first scan flip-flop in a scan chain.

In a second implementation form of the control circuit according to the first aspect as such or any preceding implementation form of the first aspect, the first test control signal, the second test control signal, the third test control signal, and the fourth test control signal are generated by a test control unit coupled to an integrated circuit comprising the control circuit.

In a third implementation form of the control circuit according to the first aspect as such or any preceding implementation form of the first aspect, the control circuit further includes a second flip-flop, a second NOT gate, a third multiplexer, a fourth multiplexer, a third OR gate, a fourth OR gate, and a second clock gate circuit. A data terminal of the second flip-flop configured to receive the first scan enable signal, a clock terminal of the second flip-flop configured to receive the first clock signal, and an output terminal of the second flip-flop configured to provide a second latched scan enable signal. The second NOT gate is configured to receive the second latched scan enable signal from the second flip-flop and provide an inverted second latched scan enable signal. A first input of the third multiplexer configured to receive the first test control signal, a second input of the third multiplexer configured to receive the second test control signal, a third input of the third multiplexer configured to receive the second latched scan enable signal, a fourth input of the third multiplexer configured to receive the inverted second latched scan enable signal, a first select terminal of the third multiplexer configured to receive a first select signal, and a second select terminal of the third multiplexer configured to receive a second select signal, the third multiplexer is configured such that the inverted second latched scan enable signal is provided at an output of the third multiplexer in response to the first latched scan enable signal being provided at the output of the first multiplexer, and the third multiplexer is configured such that the second latched scan enable signal is provided at the output of the third multiplexer in response to the inverted first latched scan enable signal being provided at the output of the first multiplexer. A fourth multiplexer, a first input of the fourth multiplexer configured to receive a second functional logic signal, a second input of the fourth multiplexer configured to receive an output signal from the third multiplexer in accordance with the first select signal, and the second select signal, and a select terminal of the fourth multiplexer configured to receive the third test control signal. A first input of the third OR gate is configured to receive the first scan enable signal, and a second input of the third OR gate is configured to receive the fourth test control signal. A first input of the fourth OR gate coupled to an output of the third OR gate, a second input of the fourth OR gate configured to receive an output signal from the fourth multiplexer in accordance with the third test control signal. A second clock gate circuit comprising a second latch coupled to a second AND gate, a data terminal of the second latch coupled to an output of the fourth OR gate, a gated negative-set terminal of the second latch configured to receive the first clock signal, the second clock gate circuit configured to provide a third clock signal, and the third clock signal being delayed by a clock pulse from the second clock signal.

In a fourth implementation form of the control circuit according to the first aspect as such or any preceding implementation form of the first aspect, the second clock gate circuit is configured to provide the third clock signal to a last scan flip-flop in a scan chain.

In a fifth implementation form of the control circuit according to the first aspect as such or any preceding implementation form of the first aspect, each of the first latch, the second latch, or both, are a gated D latch-type.

In a sixth implementation form of the control circuit according to the first aspect as such or any preceding implementation form of the first aspect, the first select signal and the second select signal are provided by a scan decoder.

A second aspect relates to an integrated circuit. The integrated circuit includes a control circuit and a scan chain. The control circuit is configured to receive a first clock signal and a first scan enable signal, and generate a second clock signal and a third clock signal based on the first clock signal and the first scan enable signal, the third clock signal being delayed by a clock pulse from the second clock signal, and the first clock signal, the second clock signal, and the third clock signal having the same duty cycle. The scan chain includes a first scan flip-flop and a last scan flip-flop, a clock terminal of the first scan flip-flop configured to receive the second clock signal, a clock terminal of the last scan flip-flop configured to receive the third clock signal, a scan enable input of the first scan flip-flop configured to receive a second scan enable signal, and a scan enable input of the last scan flip-flop configured to receive a third scan enable signal.

In a first implementation form of the integrated circuit according to the second aspect as such, the scan chain includes a plurality of scan flip-flops. A scan input terminal of the first scan flip-flop is configured to receive a test pattern. A scan input terminal of each subsequent scan flip-flop in the scan chain coupled to an output terminal of the preceding scan flip-flop.

In a second implementation form of the integrated circuit according to the second aspect as such or any preceding implementation form of the second aspect, the first scan enable signal is a logic AND function of the second scan enable signal and the third scan enable signal.

In a third implementation form of the integrated circuit according to the second aspect as such or any preceding implementation form of the second aspect, the first scan enable signal is provided from a logic built-in self-test (LBIST) or using a scan enable pad from an Automatic Test Pattern Generation (ATPG) test tool.

In a fourth implementation form of the integrated circuit according to the second aspect as such or any preceding implementation form of the second aspect, the control circuit includes a first flip-flop, a first NOT gate, a first multiplexer, a second multiplexer, a first OR gate, a second OR gate, and a first clock gate circuit. A data terminal of the first flip-flop is configured to receive the first scan enable signal. A clock terminal of the first flip-flop is configured to receive the first clock signal. An output terminal of the first flip-flop configured to provide a first latched scan enable signal. The first NOT gate is configured to receive the first latched scan enable signal and provide an inverted first latched scan enable signal. A first input of the first multiplexer is configured to receive a first test control signal, a second input of the first multiplexer is configured to receive a second test control signal, a third input of the first multiplexer is configured to receive the first latched scan enable signal, a fourth input of the first multiplexer is configured to receive the inverted first latched scan enable signal, a first select terminal of the first multiplexer is configured to receive a first select signal, and a second select terminal of the first multiplexer is configured to receive a second select signal. A first input of the second multiplexer is configured to receive a functional logic signal, a second input of the second multiplexer is configured to receive an output signal from the first multiplexer in accordance with the first select signal and the second select signal, and a select terminal of the second multiplexer is configured to receive a third test control signal. A first input of the first OR gate is configured to receive the first scan enable signal. A second input of the first OR gate is configured to receive a fourth test control signal. A first input of the second OR gate is coupled to an output of the first OR gate. A second input of the second OR gate is configured to receive an output signal from the second multiplexer in accordance with the third test control signal. The first clock gate circuit includes a first latch and an AND gate. A data terminal of the first latch coupled to an output of the second OR gate. A gated negative-set terminal of the first latch is configured to receive the first clock signal. The first clock gate circuit is configured to provide the second clock signal or the third clock signal.

In a fifth implementation form of the integrated circuit according to the second aspect as such or any preceding implementation form of the second aspect, a logic value of the first select signal is equal to a logic value of the second scan enable signal, and a logic value of the second select signal is equal to a logic value of the third scan enable signal.

In a sixth implementation form of the integrated circuit according to the second aspect as such or any preceding implementation form of the second aspect, a logic value of the first select signal is equal to an inverted logic value of the second scan enable signal, and a logic value of the second select signal is equal to an inverted logic value of the third scan enable signal.

A third aspect relates to a method for testing a scan chain in an integrated circuit. The method includes receiving, by a control circuit, a first clock signal and a first scan enable signal; generating, by the control circuit, a second clock signal and a third clock signal based on the first clock signal and the first scan enable signal, the third clock signal being delayed by a clock pulse from the second clock signal, and the first clock signal, the second clock signal, and the third clock signal having the same duty cycle; providing the second clock signal to a clock terminal of a first scan flip-flop of the scan chain, a scan enable input of the first scan flip-flop configured to receive a second scan enable signal; and providing the third clock signal to a clock terminal of a last scan flip-flop of the scan chain, a scan enable input of the last scan flip-flop configured to receive a third scan enable signal.

In a first implementation form of the method according to the third aspect as such, the scan chain includes a plurality of scan flip-flops. The method further includes receiving, at a scan input terminal of the first scan flip-flop, a test pattern. A scan input terminal of each subsequent scan flip-flop in the scan chain is coupled to an output terminal of the preceding scan flip-flop.

In a second implementation form of the method according to the third aspect as such or any preceding implementation form of the third aspect, the first scan enable signal is a logic AND function of the second scan enable signal and the third scan enable signal.

In a third implementation form of the method according to the third aspect as such or any preceding implementation form of the third aspect, the first scan enable signal is provided from a logic built-in self-test (LBIST) or using a scan enable pad from an Automatic Test Pattern Generation (ATPG) test tool.

In a fourth implementation form of the method according to the third aspect as such or any preceding implementation form of the third aspect, scan flip-flops of the scan chain have a multi-cycle path or include a false path.

In a second implementation form of the method according to the third aspect as such or any preceding implementation form of the third aspect, the method further includes providing a test pattern to a scan input terminal of the first scan flip-flop and observing an output terminal of the last scan flip-flop to detect errors in the scan chain.

Although the description has been described in detail, it should be understood that various changes, substitutions, and alterations may be made without departing from the spirit and scope of this disclosure as defined by the appended claims. The same elements are designated with the same reference numbers in the various figures. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

The specification and drawings are, accordingly, to be regarded simply as an illustration of the disclosure as defined by the appended claims, and are contemplated to cover any and all modifications, variations, combinations, or equivalents that fall within the scope of the present disclosure.

What is claimed is:

1. A control circuit, comprising:
   a first flip-flop, a data terminal of the first flip-flop configured to receive a first scan enable signal, a clock terminal of the first flip-flop configured to receive a first clock signal, an output terminal of the first flip-flop configured to provide a first latched scan enable signal;
   a first NOT gate configured to receive the first latched scan enable signal and provide an inverted first latched scan enable signal;
   a first multiplexer, a first input of the first multiplexer configured to receive a first test control signal, a second input of the first multiplexer configured to receive a second test control signal, a third input of the first multiplexer configured to receive the first latched scan enable signal, a fourth input of the first multiplexer configured to receive the inverted first latched scan enable signal, a first select terminal of the first multiplexer configured to receive a first select signal, and a second select terminal of the first multiplexer configured to receive a second select signal;
   a second multiplexer, a first input of the second multiplexer configured to receive a functional logic signal, a second input of the second multiplexer configured to receive an output signal from the first multiplexer in accordance with the first select signal and the second select signal, and a select terminal of the second multiplexer configured to receive a third test control signal;
   a first OR gate, a first input of the first OR gate configured to receive the first scan enable signal, a second input of the first OR gate configured to receive a fourth test control signal;
   a second OR gate, a first input of the second OR gate coupled to an output of the first OR gate, a second input of the second OR gate configured to receive an output signal from the second multiplexer in accordance with the third test control signal; and a first clock gate circuit comprising a first latch coupled to a first AND gate, a data terminal of the first latch coupled to an output of the second OR gate, a gated negative-set terminal of the first latch configured to receive the first clock signal, the first clock gate circuit configured to provide a second clock signal.

2. The control circuit of claim 1, wherein the first clock gate circuit is configured to provide the second clock signal to a first scan flip-flop in a scan chain.

3. The control circuit of claim 1, wherein the first test control signal, the second test control signal, the third test control signal, and the fourth test control signal are generated by a test control unit coupled to an integrated circuit comprising the control circuit.

4. The control circuit of claim 1, further comprising:
a second flip-flop, a data terminal of the second flip-flop configured to receive the first scan enable signal, a clock terminal of the second flip-flop configured to receive the first clock signal, an output terminal of the second flip-flop configured to provide a second latched scan enable signal;
a second NOT gate configured to receive the second latched scan enable signal from the second flip-flop and provide an inverted second latched scan enable signal;
a third multiplexer, a first input of the third multiplexer configured to receive the first test control signal, a second input of the third multiplexer configured to receive the second test control signal, a third input of the third multiplexer configured to receive the second latched scan enable signal, a fourth input of the third multiplexer configured to receive the inverted second latched scan enable signal, a first select terminal of the third multiplexer configured to receive a first select signal, and a second select terminal of the third multiplexer configured to receive a second select signal, the third multiplexer is configured such that the inverted second latched scan enable signal is provided at an output of the third multiplexer in response to the first latched scan enable signal being provided at an output of the first multiplexer, and the third multiplexer is configured such that the second latched scan enable signal is provided at the output of the third multiplexer in response to the inverted first latched scan enable signal being provided at the output of the first multiplexer;
a fourth multiplexer, a first input of the fourth multiplexer configured to receive a second functional logic signal, a second input of the fourth multiplexer configured to receive an output signal from the third multiplexer in accordance with the first select signal and the second select signal, and a select terminal of the fourth multiplexer configured to receive the third test control signal;
a third OR gate, a first input of the third OR gate configured to receive the first scan enable signal, a second input of the third OR gate configured to receive the fourth test control signal;
a fourth OR gate, a first input of the fourth OR gate coupled to an output of the third OR gate, a second input of the fourth OR gate configured to receive an output signal from the fourth multiplexer in accordance with the third test control signal; and
a second clock gate circuit comprising a second latch coupled to a second AND gate, a data terminal of the second latch coupled to an output of the fourth OR gate, a gated negative-set terminal of the second latch configured to receive the first clock signal, the second clock gate circuit configured to provide a third clock signal, and the third clock signal being delayed by a clock pulse from the second clock signal.

5. The control circuit of claim 4, wherein the second clock gate circuit is configured to provide the third clock signal to a last scan flip-flop in a scan chain.

6. The control circuit of claim 4, wherein each of the first latch, the second latch, or both, are a gated D latch-type.

7. The control circuit of claim 1, wherein the first select signal and the second select signal are provided by a scan decoder.

8. An integrated circuit, comprising:
a control circuit configured to:
receive a first clock signal and a first scan enable signal, and
generate a second clock signal and a third clock signal based on the first clock signal and the first scan enable signal, the third clock signal being delayed by a clock pulse from the second clock signal, and the first clock signal, the second clock signal, and the third clock signal having the same duty cycle; and
a scan chain comprising a first scan flip-flop and a last scan flip-flop, a clock terminal of the first scan flip-flop configured to receive the second clock signal, a clock terminal of the last scan flip-flop configured to receive the third clock signal, a scan enable input of the first scan flip-flop configured to receive a second scan enable signal, and a scan enable input of the last scan flip-flop configured to receive a third scan enable signal.

9. The integrated circuit of claim 8, wherein the scan chain comprises a plurality of scan flip-flops, a scan input terminal of the first scan flip-flop configured to receive a test pattern, a scan input terminal of each subsequent scan flip-flop in the scan chain coupled to an output terminal of the preceding scan flip-flop.

10. The integrated circuit of claim 8, wherein the first scan enable signal is a logic AND function of the second scan enable signal and the third scan enable signal.

11. The integrated circuit of claim 8, wherein the first scan enable signal is provided from a logic built-in self-test (LBIST) or using a scan enable pad from an Automatic Test Pattern Generation (ATPG) test tool.

12. The integrated circuit of claim 8, wherein the control circuit comprises:
a first flip-flop, a data terminal of the first flip-flop configured to receive the first scan enable signal, a clock terminal of the first flip-flop configured to receive the first clock signal, an output terminal of the first flip-flop configured to provide a first latched scan enable signal;
a first NOT gate configured to receive the first latched scan enable signal and provide an inverted first latched scan enable signal;
a first multiplexer, a first input of the first multiplexer configured to receive a first test control signal, a second input of the first multiplexer configured to receive a second test control signal, a third input of the first multiplexer configured to receive the first latched scan enable signal, a fourth input of the first multiplexer configured to receive the inverted first latched scan enable signal, a first select terminal of the first multiplexer configured to receive a first select signal, and a second select terminal of the first multiplexer configured to receive a second select signal;
a second multiplexer, a first input of the second multiplexer configured to receive a functional logic signal, a second input of the second multiplexer configured to receive an output signal from the first multiplexer in accordance with the first select signal and the second select signal, and a select terminal of the second multiplexer configured to receive a third test control signal;

a first OR gate, a first input of the first OR gate configured to receive the first scan enable signal, a second input of the first OR gate configured to receive a fourth test control signal;

a second OR gate, a first input of the second OR gate coupled to an output of the first OR gate, a second input of the second OR gate configured to receive an output signal from the second multiplexer in accordance with the third test control signal; and a first clock gate circuit comprising a first latch and an AND gate, a data terminal of the first latch coupled to an output of the second OR gate, a gated negative-set terminal of the first latch configured to receive the first clock signal, the first clock gate circuit configured to provide the second clock signal or the third clock signal.

13. The integrated circuit of claim 12, wherein a logic value of the first select signal is equal to a logic value of the second scan enable signal, and a logic value of the second select signal is equal to a logic value of the third scan enable signal.

14. The integrated circuit of claim 12, wherein a logic value of the first select signal is equal to an inverted logic value of the second scan enable signal, and a logic value of the second select signal is equal to an inverted logic value of the third scan enable signal.

15. A method for testing a scan chain in an integrated circuit, the method comprising:

receiving, by a control circuit, a first clock signal and a first scan enable signal;

generating, by the control circuit, a second clock signal and a third clock signal based on the first clock signal and the first scan enable signal, the third clock signal being delayed by a clock pulse from the second clock signal, and the first clock signal, the second clock signal, and the third clock signal having the same duty cycle;

providing the second clock signal to a clock terminal of a first scan flip-flop of the scan chain, a scan enable input of the first scan flip-flop configured to receive a second scan enable signal; and providing the third clock signal to a clock terminal of a last scan flip-flop of the scan chain, a scan enable input of the last scan flip-flop configured to receive a third scan enable signal.

16. The method of claim 15, wherein the scan chain comprises a plurality of scan flip-flops, the method further comprising receiving, at a scan input terminal of the first scan flip-flop, a test pattern, a scan input terminal of each subsequent scan flip-flop in the scan chain being coupled to an output terminal of the preceding scan flip-flop.

17. The method of claim 15, wherein the first scan enable signal is a logic AND function of the second scan enable signal and the third scan enable signal.

18. The method of claim 15, wherein the first scan enable signal is provided from a logic built-in self-test (LBIST) or using a scan enable pad from an Automatic Test Pattern Generation (ATPG) test tool.

19. The method of claim 15, wherein scan flip-flops of the scan chain have a multi-cycle path or include a false path.

20. The method of claim 15, further comprising:

providing a test pattern to a scan input terminal of the first scan flip-flop; and observing an output terminal of the last scan flip-flop to detect errors in the scan chain.

* * * * *